United States Patent
Salamone et al.

(10) Patent No.: US 7,562,369 B1
(45) Date of Patent: Jul. 14, 2009

(54) METHOD AND SYSTEM FOR DYNAMIC CONFIGURATION OF ACTIVATORS IN A CLIENT-SERVER ENVIRONMENT

(75) Inventors: Julie Salamone, Medford, MA (US); Alan Clarke, Dublin (IE); Paul Kiely, Leixlip (IE); Ronald C Witham, Jr., Halibut Bay (CA); Kevin Sullivan, Checkpoint (IE)

(73) Assignee: IONA Technologies, PLC, Dublin (IE)

( * ) Notice: Subject to any disclaimer, the term of this patent is extended or adjusted under 35 U.S.C. 154(b) by 1399 days.

(21) Appl. No.: 09/890,536

(22) PCT Filed: Jan. 28, 2000

(86) PCT No.: PCT/US00/02014

§ 371 (c)(1),
(2), (4) Date: Jan. 15, 2003

(87) PCT Pub. No.: WO00/45238

PCT Pub. Date: Aug. 3, 2000

Related U.S. Application Data

(60) Provisional application No. 60/117,943, filed on Jan. 29, 1999, provisional application No. 60/117,948, filed on Jan. 29, 1999, provisional application No. 60/117,949, filed on Jan. 29, 1999.

(51) Int. Cl.
*G06F 9/00* (2006.01)
(52) U.S. Cl. .................. 719/328; 719/331; 719/332
(58) Field of Classification Search .......... 719/315, 719/316, 331, 332, 328
See application file for complete search history.

(56) References Cited

U.S. PATENT DOCUMENTS

| 6,249,803 B1 * | 6/2001 | Jindal et al. ........... 709/203 |
| 6,516,354 B2 * | 2/2003 | Cavanaugh ............ 719/316 |
| 6,718,376 B1 * | 4/2004 | Chu et al. ............. 709/223 |

OTHER PUBLICATIONS

Schmidt, et al., *Object Interconnections*, SIGS C++ Sep. 1998, pp. 1-9.
Dragan, Richard V., Plugging in: the LiveConnect/Plug-IN SDK 3.0, PC Magazine, Oct. 1996 vol. 15 No. 17 pp. 284(2).
*The Common Object Request Broker: Architecture and Specification*, Feb. 1998, Chapter 5-9, & 18.
*Java 1.2 Unleashed*, 1998, Chapter 38.
International Search Report for PCT/US00/02014, Aug. 3, 2000.

* cited by examiner

*Primary Examiner*—Meng-Ai An
*Assistant Examiner*—Phuong N Hoang
(74) *Attorney, Agent, or Firm*—IP Authority, LLC; Ramraj Soundararajan

(57) ABSTRACT

A computer implemented method of activating a process. The method includes the steps of generating one or more first plug-ins each configured to activate a target process, dynamically registering the first plug-ins with a second plug-in, and permanently storing information relating to each registered first plug-in. A server computer in a client-server computer system that includes one or more first plug-ins each configured to activate a target process, and a second plug-in configured to dynamically register the first plug-ins and to permanently store information relating to the registered first plug-ins.

7 Claims, 14 Drawing Sheets

ACTIVATION AND LOCATION CLASS ASSOCIATIONS

METHOD AND SYSTEM FOR DYNAMIC CONFIGURATION OF ACTIVATORS IN A CLIENT-SERVER ENVIRONMENT

This application is a U.S. national phase entry of PCT/US00/02014 filed Jan. 28, 2000, which claims priority benefit of U.S. provisional applications 60/117,943; 60/117,948; and 60/117,949; all three of which were filed on Jan. 29, 1999.

FIELD OF THE INVENTION

The present invention is directed to configuring a server computer in a client-server environment and, in particular, to dynamically configuring activators.

BACKGROUND OF THE INVENTION

With the rise of the interconnected computer networks such as the Internet, it is possible to construct complex transaction-based applications that are distributed over several networked computers. In the simplest scenario, in general, these transaction-based applications function in the following way. A software application program, which executes on a client, initiates a transaction that requires access to services provided by a distant computer, called a server. Examples of these services could be an update to a database such as a bank's database, an execution of a purchase order such as in the case of purchase of a security and the like. Typically, the client sends a "request" message to the server, which then sends a "response" message containing a response to the request.

Typically, the server is not a single computer, rather a collection of interconnected heterogenous computers. The request message is then be formatted in such a way that all the interconnected computers can understand and respond to the request message. If the collection of interconnected computers is configured in an object-oriented programming model, then software object (or objects) that are capable of working together to provide a response to the request message can be distributed among the several computers. But in order to access the objects from a remote computer the objects must somehow publish their existence, their addresses, their properties, the services they provide, and other details to the "outside" world. Then, a client may be able to use the services provided by sending a request message in a manner similar to making a remote procedure call ("rpc") and obtaining a response to that message.

Various paradigms exist as a result of the need to standardize the methods by which objects can be distributed and accessed over a network. These are Microsoft Corporation's Distributed Component Object Model (DCOM), JavaSoft's Java/Remote Method Invocation (Java/RMI), and Object Management Group's Common Object Request Broker Architecture (CORBA).

Though some differences are present among these models, they principally work in the following way. Objects that provide services are typically located on servers. These objects are queried by applications running on clients using a specified data communication transport layer protocol—the Object Remote Procedure Call (ORPC) for DCOM; the Java Remote Method Protocol (JRMP) for Java/RMI; and the Internet Inter-ORB Protocol (IIOP) for CORBA. A client suitably formats a query message in the appropriate protocol language and transmits the query message, which is routed to the appropriate server, whereupon it is executed, and a response message is formatted and routed back to the client. As referred to herein, the term "object" may mean the object definition, associated operations, attributes, etc., and implementation for that object. As will be appreciated by those of skill in the art, at times the term "object type" is used to refer to the definition of the operations and attributes that software external to the object may use to examine and operate upon the object. The "object type" is also known as the "interface." Also, the term "object" may be used to refer to an actual run-time instance of an object and will be made clear by the context.

A server configured to be a Java/RMI server comprises objects that have predefined interfaces, which can be used to access the server objects remotely from another machine's Java Virtual Machine (JVM). A Java/RMI server object interfaces declare a set of methods that indicate the services offered by that server object. A program resident on the server called an RMI Registry stores and makes available to clients information about server objects. Typically, a client object obtains information regarding the methods and other properties of a server object by performing an operation such as "lookup" for a server object reference. This lookup typically works by the client object specifying an address in the form of a Universal Resource Locator (URL) and transmitting the address to the server's RMI Registry.

The clients and servers also include interceptors. The interceptors provide hooks to programmers to execute their piece of code at certain points during ORB. Typical uses of the interceptors include: transaction service integration, security message compression and encryption, fault tolerance and other operations such as tracing, profiling, debugging, logging.

In CORBA, each CORBA object transparently interacts with an Object Request Broker (ORB), which provides a means to access either local or remote objects. The ORB is essentially a remote method invocation facility, and forms the lowest layer of the several layers in CORBA. Each CORBA server object exposes a set of methods, and it declares its interface. A CORBA client obtains an object reference and determines which methods are provided by the object. A CORBA client needs only two pieces of information: a remote object's name, and how to use its interface. The ORB is responsible to locate the object, provide a vehicle by means of which a query is transmitted to a server object and a response is transmitted back to the client object. In general, a CORBA object interacts with an ORB by either using an ORB's interface or using an Object Adapter.

There are two kinds of object adapters, the Basic Object Adapter (BOA) and the Portable Object Adapter (POA). The BOA (or the POA) typically has methods for activating and deactivating objects, and for activating and deactivating the entire server. These are intended for systems where the ORB and the server are separate programs or even on separate machines. Different vendors supplying CORBA-compliant servers ordinarily choose one or the other of these methods of an object-ORB interaction.

As described above, CORBA objects take form within server applications. In a server, CORBA objects are implemented and represented by programming language functions and data. The programming language entities that implement and represent CORBA objects are called servants. A servant is an entity that provides a body for a CORBA object, and for this reason, the servant is said to incarnate the CORBA object.

Object adapters such as the CORBA-standard Portable Object Adapter (POA) mediate between an ORB and a set of programming language servants. In general, though there could be many instances of POAs to support CORBA objects of different styles, and all server applications have at least one POA called the Root POA. Each POA instance represents a grouping of objects that have similar characteristics. These characteristics are controlled via POA policies that are specified when a POA is created. The Root POA, which is present in all server applications, has a standard set of policies. POA policies are a set of objects that are used to define the characteristics of a POA and the objects created within it. The CORBA standard specifies that interfaces for POA, POA manager (which is a class to manage multiple POAs) and the POA policies should be defined in a standard module.

The above discussed technologies have been utilized in the Internet. However, the next phase of the Internet revolution is predicted to be interconnection of isolated Internet systems with the systems that run the business to create a responsive, flexible, scalable, and differentiated eBusiness enterprise. The information systems that connect eBusiness with the enterprise are coming to be known as enterprise portals.

Enterprise portals can act as new storefronts, new front-offices, new sales and support agents for the enterprise, with profound implications. Enterprise portals will leverage an enterprise's processes, data, and transactions on the Internet. They will simplify access to a mix of Internet and non-Internet applications, built with heterogeneous formats, platforms, protocols and software. This universe of diverse content, interactions, transactions, and application functions will require new methods of organization and management, particularly to keep up with frequent changes in the business.

The enterprise portals are becoming popular because the Internet affords large opportunities to extend business and invent new business models. Enterprise portals hold the key for these established companies to "bricks and clicks" strategies that weave online services with their existing channels, production facilities, and other business elements into a powerful combination.

Enterprise portals require scalable, flexible and open distributed platforms, the ability to leverage and extend the full range of resources inside and outside of the corporate walls, and the ability to accommodate rapid, continual change. At their root, enterprise portals host a different kind of application—the composite application.

Composite applications combine new business logic with existing logic, processes, and data to meet business needs. A new system is required to provide all of the components of an enterprise portal infrastructure. This new set of server-based products marshals the company's expertise in design and support of enterprise systems from diverse applications using object and component technologies.

SUMMARY OF THE INVENTION

Therefore, the present invention provides a flexible, robust, CORBA 3.0 middleware engine. Adaptive Runtime Technology™ (ART) framework, a microkernel architecture that supports dynamic configurations of the architecture. It should be noted that the present invention is described below by discussing various ports of the ART framework.

In particular, the present invention provides a computer implemented method of activating a process. The method includes the steps of generating one or more first plug-ins each configured to activate a target process, dynamically registering the first plug-ins with a second plug-in and permanently storing information relating to each registered first plug-in.

The method can further include the steps of storing a flag for each registered first plug-in, perpetually activating the corresponding target process if the flag is set to a first state, and activating the corresponding target process upon a request if the flag is set to a second state.

The method can also include the steps of generating an exception to indicate that a target process is inactive when its flag is not set to the first state or the second state, providing a unique identifier for each target process, and sending and receiving a message between the first and second plug-ins using the identifiers. The message can include information relating to a state change of the target processes, and the state includes an activated state and a deactivated state.

The present invention further provides a server computer in a client-server computer system. The system includes one or more first plug-ins each configured to activate a target process, and a second plug-in configured to dynamically register the first plug-ins and to permanently store information relating to the registered first plug-ins.

The second plug-in of the server can also include a memory configured to store a flag for each registered first plug-in. The second plug-in can be further configured to perpetually activate target processes having their flags set at a first state and to activate target processes, upon receiving a request, having their flags set at a second state.

Moreover, the second plug-in can be further configured to generate an exception to indicate that the target process is inactive when the flag is not set to the first state or the second state.

The server computer can also include a first computer program object configured to provide a unique identifier for each target process and configured to send a message using the identifiers. The message includes information relating a state change of the target processes, and the state includes an activated state and a deactivated state.

BRIEF DESCRIPTION OF THE DRAWINGS

Preferred features of the present invention are disclosed in the accompanying drawings, wherein similar reference characters denote similar elements throughout the several views, and wherein:

FIG. 4 is a diagram illustrating class association between a location plug-in and an activation plug-in;

DETAILED DESCRIPTION OF THE INVENTION

Figure 1:
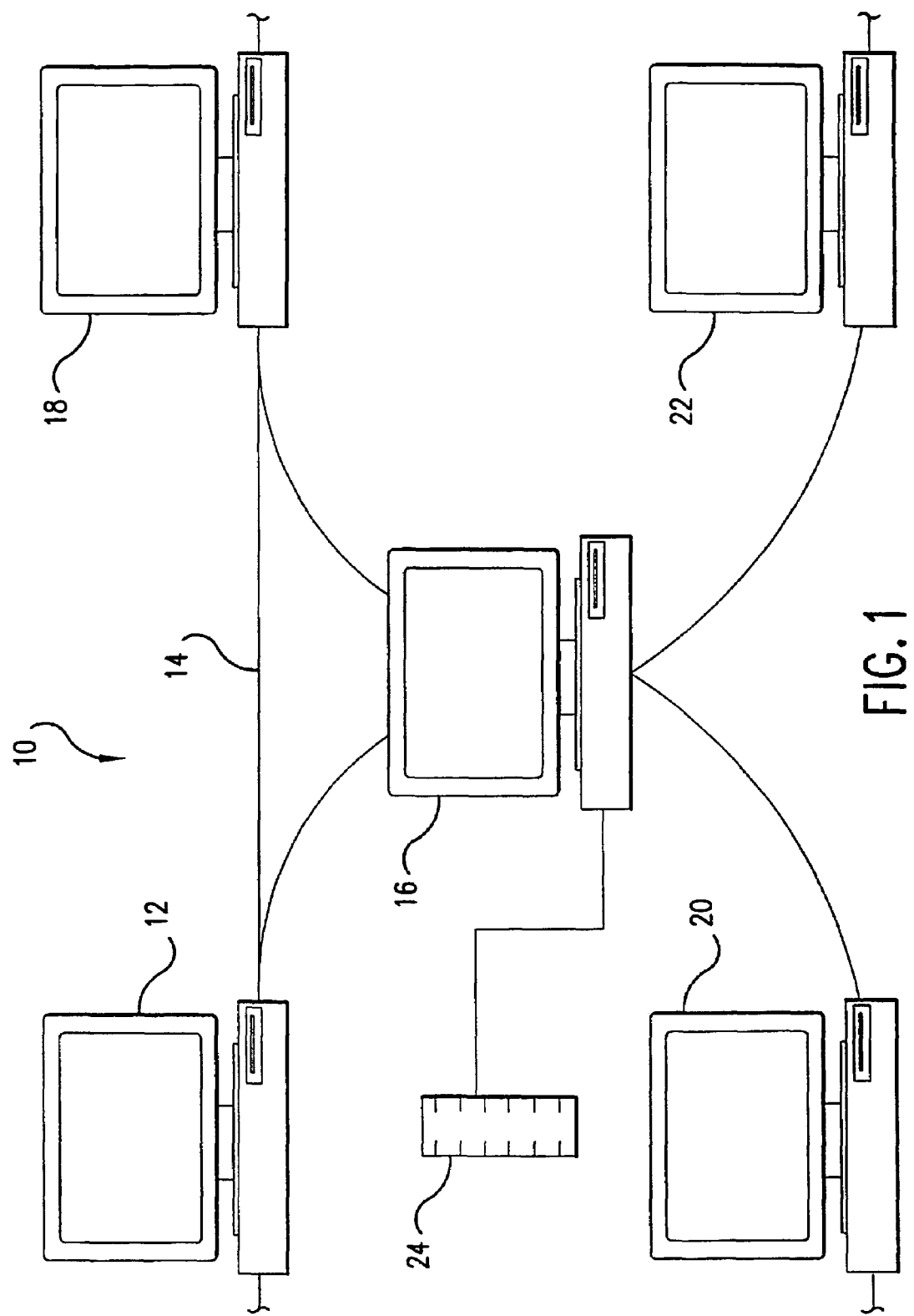
FIG. 1 is a diagram illustrating a computer network for the distributed objects of the present invention.

Referring to FIG. 1, distributed objects of the present invention are located on one or more computers linked together by a computer network exemplified in a network 10. In particular, the network 10 includes a computer 12 coupled to a network 14. The network 14 can further include a server, router or the like 16 in addition to other computers 18, 20, and 22 such that data, instructions and/or messages can be passed among the networked computers. A mass storage devices 24 may also be connected to the server 16 or to any of the computers. Further, some computers 12, 18 may include an independent network connection between them, whereas other computers 20, 22 may not include such a connection. Various ways to design, construct and implement the computer network as known in the art are contemplated within this invention.

Figure 2:
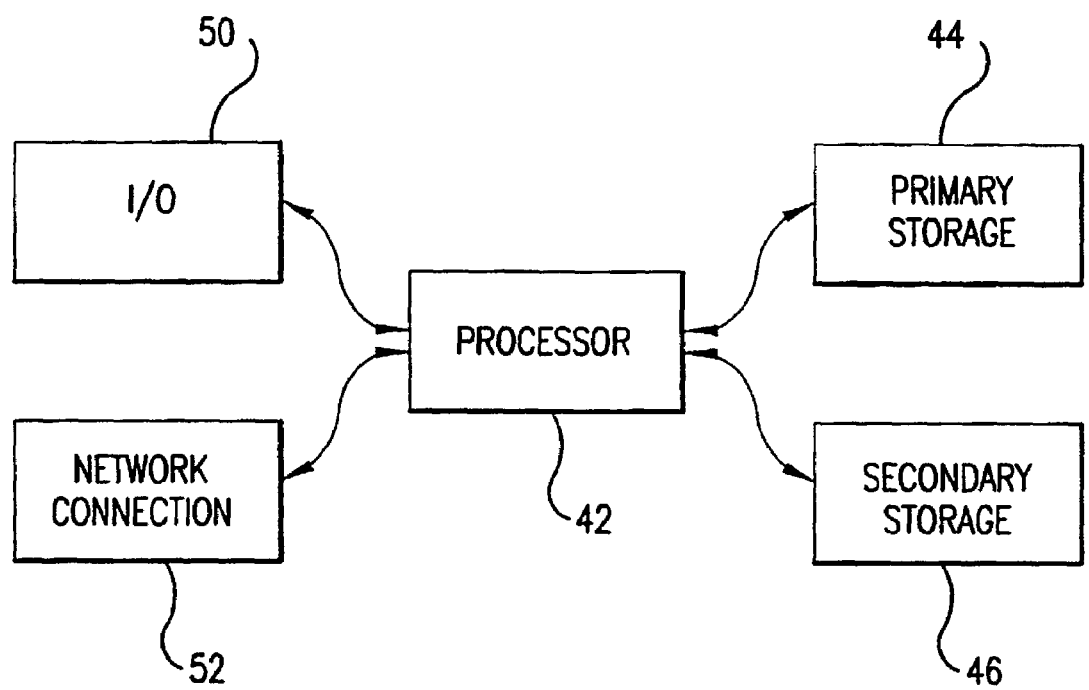
FIG. 2 is a block diagram of a typical computer of the present invention.

Referring to FIG. 2, each computers 12, 16, 18, 20, and 22 includes a processing unit 42, a primary storage device 44 and a secondary storage device 46. The processing unit 42 can be, but not limited to, a central processing unit (CPU), or multiple processors including parallel processors or distributed processors. The primary memory device 44 includes random access memory (RAM) and read only memory (ROM). The RAM stores programming instructions and data, including distributed objects and their associated data and instructions, for processes currently operating on the processor 42. The ROM stores basic operating instructions, data and objects used by the computer to perform its functions. The secondary storage device 46, such as a hard disk, CD ROM, magneto-optical (optical) drive, tape drive or the like, is coupled bidirectionally with processor 42. The secondary storage device 46 generally includes additional programming instructions, data and objects that typically are not in active use by the processor, although the address space may be accessed by the processor, e.g., for virtual memory or the like.

Furthermore, each of the above described computers can include an input/output source 50 that typically includes input media such as a keyboard, pointer devices (e.g., a mouse or stylus) and the like. Each computer can also include a network connection 52. Other variations of the above discussed the computer and its components available to one of skill in the art are also contemplated within the present invention.

In the present invention computer network is defined to include a set of communications channels interconnecting a set of computer systems that can communicate with each other. The communications channels can include transmission media such as, but not limited to, twisted pair wires, coaxial cable, optical fibers, satellite links, and/or digital microwave radio. The computer systems can be distributed over large, or "wide" areas (e.g., over tens, hundreds, or thousands of miles. WAN), or local area networks (e.g., over several feet to hundreds of feet, LAN). Furthermore, various local- and wide-area networks can be combined to form aggregate networks of computer systems. One example of such a network of computers is the "Internet".

Having discussed a client-sever computing environment, the following is the ART framework briefly described above.

I. Art Activator

For ART, activation functionality is preferably implemented as a plug-in to a generic ART daemon. The activation plug-in is responsible for activating a target process and has no persistent data to manage. A target process is an executable process containing one or more target endpoints.

One or more activation plug-ins may be configured within a location domain. There may be zero to many activation plug-ins on a single host. But an ART daemon with the activation plug-in preferably lives on the host where the target process resides. Also note that different location domains and their respective location plug-ins may share a single activation plug-in.

For any communications to occur in a location domain between the location plug-in and any activation plug-ins, each activation plug-in dynamically registers itself with the location plug-in via an Activator Registry interface which is obtained at configuration time. The location plug-in is required to store every registered Activator in its Activator List in permanent storage. If the host where the location plug-in resides crashes, then it can be re-started without requiring the activation plug-ins to re-register or the location plug-in to obtain state information on all its IMR entries.

When the location plug-in gets control and there is an endpoint name match but the associated target process is not activated, the location plug-in checks the start-up flags in the static IMR entry for the associated target process. If the start-up flags are not set to "always" or "on demand", a Process-NotActive exception is required to be returned to the client. Otherwise, the location plug-in first creates a target process dynamic IMR entry with a target process state of STARTING. In order to find an appropriate activation plug-in to start a target process, the location plug-in will map the target endpoint's associated target process static IMR entry in the IMR to the registered Activator information. Finally, the location plug-in creates a ProcessMonitor for notification of any target process state changes and sends a request to start the target process.

When the activation plug-in receives a request to start a target process, it identifies any invalid parameters and security violations. The activation plug-in then creates a Process representing the target process and stores the associated ProcessMonitor in it. The activation plug-in returns the Process to the location plug-in. At this time, the location plug-in stores the Process in the associated target process dynamic IMR entry. Depending on the wait options of the start process request, the target process may or may not have been started.

At any point in time, the activation plug-in may return information about a target process state change. If the target process is up and running, the activation plug-in announces to the location plug-in that the target process was activated via the ProcessMonitor. The location plug-in updates the appropriate dynamic IMR entry and transitions the target process state to RUNNING. The activation plug-in then waits on the target process. This allows target processes to be monitored. In addition, network traffic is reduced if the location plug-in has the target process's current state.

If the target process dies, the activation plug-in announces this state change to the location plug-in via the ProcessMonitor. The location plug-in deletes the dynamic IMR entries associated with the target process name in the IMR and sends a request to remove the associated Process. For target process transparent restart, the location plug-in then checks the target process's start-up flags. If "disable start", then target process restart will not occur. If "on demand", target process restart occurs when a client request arrives for that target process again. If "always", then the location plug-in immediately attempts to restart the target process. If "on demand" or "always" and unsuccessfully started, an exception is required to be returned to the client.

This section describes a low-level common OS-independent abstraction for remote process activation without compromising system security. A process is launched with a specified identity, running a specified program with specified arguments and environment. There are also capabilities to ask or force the process to terminate, and notice when it does terminate. Defining the Activator at as low a level of abstraction as possible preserves the full flexibility of the underlying operating systems. More responsibility is given this way to the Locator, where the low-level abstraction can be used as appropriate.

1. Module IT_LocationCommon

This module includes common exceptions and data types amongst all Location-related interfaces.

```
module IT_LocationCommon
{
  struct EnvVariable
  {
    string      name;
    string      val;
  };
  typedef sequence<EnvVariable> EnvVariableList;
  typedef sequence<string> ArgumentList;
  struct StartUpInformation
  {
    string          pathname;
    ArgumentList    arguments;
    EnvVariableList env_variables;
    string          user; // Real user ID of target process
    string          group;// Real group ID of target process
  };
  struct SecurityId
  {
    string principal;
  };
  typedef sequence<SecurityId> SecurityIdList;
};
```

2. Module IT Activation

This module includes four interfaces; Process, ProcessMonitor, Activator, Activator Registry.

(1) The Process

The Activation plug-in provides an implementation of this interface. All Process object instances are transient. A Process is created by an Activator to represent a single target process that is to be started. The Process is returned to a Locator and stored in the target process's dynamic IMR entry in the IMR. The purpose of a Process is to provide a unique identifier for the target process for communications between the Locator and Activator since different Locators representing different location domains may share an Activator and there may be clashes with target process names.

If the entire host where the activation plug-in and all target processes reside goes down, then all Process references are invalid in the IMR but all target processes on that host have died also. Once the activation plug-in comes back up, it will re-register with one or more Locators and begin to receive requests to re-start any target processes which have a start-up option of always.

In the rare case when only the generic daemon with an activation plug-in goes down and not the entire host, then all Process references are invalid in the IMR. Once the Activator comes up it cannot monitor those target processes that it had previously created and started but they may still be running on that host. In addition, a Locator may send a request to start a target process that is already running once the Activator re-registers.

During a kill( ) operation, the associated running target process on the system is terminated if the proper access rights are allowed to do so. During a remove 0 operation, only the specified Process will be removed. Note that if the target process associated with this Process is still up and running, a ProcessStillActive exception is returned.

A management interface for the Locator will be provided to start and stop target processes. In this case, the Locator acts as an intermediary for a client request to start/stop processes. The Locator extracts credentials from the client request and then sets its own credentials to that of the client before making the request to the Activator.

The Process object maintains three timestamps. The startup timestamp is the date/time the target process is started. The died timestamp is the time/date the target process has died. The expiration timestamp is the time/date to remove the Process object after the target process has died. It should be noted that the Activator does not remove Process objects but the IT_Activation::Activator::create-process( ) requestor does. The Activator can prevent Process objects from dangling. For example, if the Locator goes down and an Activator never receives a remove( ) request. An expiration timestamp (default 24 hours, a configurable) on Process objects is obtained from configuration. If the Locator does not remove the Process, then the Activator will once the expiration time expires.

```
module IT_Activation
{
  interface Process
  {
    // Exceptions
    //
    exception ProcessStillActive { };
    exception ProcessNotExist { };
    exception InvalidSignal { };
    // This ProcessMonitor is created by the Locator for notification
    // of any target process state changes. In the rare event that
    // the generic daemon with the Location plug-in goes down, then
    // all ProcessMonitor references no longer exist for all active
    // target processes in the IMR. However when the Locator comes
    // back up, it can recover. For each and every active target
    // process, a new ProcessMonitor is created and the attribute
    // in its corresponding Process is reset.
    attribute ProcessMonitor
  process_monitor;
    // The start-up time stamp is used for informational purposes.
    // readonly attribute long       startup timestamp;
    // Allows the Activator to garbage collect a Process that is not
    // removed but the associated target process is dead.
    //
    // The died timestamp is the time/date the target process has died.
    // The expiration timestamp is the time/date to remove the Process
    // object after the target process has died.
    //
    readonly attribute long     died_timestamp;
    readonly attribute long     expiration_timestamp;
    // The state attribute is used by a Locator to determine the
    // cause of a failed target process.
    //
    enum ProcessStateValue
    {
      CREATING_PROCESS,
      CREATE_PROCESS_FAILED,
      STARTING_PROCESS,
      START_PROCESS_FAILED,
      DIED,
      RUNNING
    };
    readonly attribute ProcessStateValue    state ;
    // The pid attribute is required for killing processes, attaching
    // processes to debuggers, etc.
    //
    typedef unsigned long       ProcessId ;
    readonly attribute Process ID     pid ;
    // If an announcement that the process was not started or died,
    // remove the Process.
    //
    void
    remove (
    ) raises (
```

-continued

```
        ProcessStillActive
    );
    // Terminate process
    //
    void
    kill (
        in long                         signal
    ) raises (
        ProcessNotExist,
        InvalidSignal
    );
  }; // End of Process Interface
};
```

(2) The-Process Monitor

The Location plug-in provides an implementation of this interface. All ProcessMonitor object instances are transient. There is one ProcessMonitor per Process. The purpose of the ProcessMonitor is to receive notification of any target process state changes.

For notifying a Locator of any target process state changes, a callback model can be used. The location plug-in creates a ProcessMonitor and sends a request to start the target process. At each stage of process activation, the Activator transitions the state attribute in the Process. The normal flow begins with CREATING_PROCESS, then STARTING_PROCESS, and finally RUNNING. When a target process is up and running, the Activator will also set the startup timestamp and pid in the Process and announce its successful startup to the Locator.

If the NO_WAIT option was specified on the IT_Activation::Activator::createprocess( ) operation and a start-up attempt fails, the Activator can announce this event to the Locator. To determine the reason for failure, the Locator can obtain the state attribute in the Process and return the appropriate exception to the client.

The activation plug-in also helps in monitoring target processes by waiting for its children to die that it had exec-ed. When a target process has died, the Activator will set the state to DIED in the Process and announce its death to the Locator. The location plug-in then deletes the dynamic IMR entries associated with this target process name, deletes the associated ProcessMonitor and sends a request back to remove the Process.

The exceptions on the announce_process( ) operation are required to be logged. For ProcessNotExist, the target process that was started can be killed. This indicates that a target process was started by an Activator but there is no target process static IMR entry in the Implementation Repository.

In the rare case when the generic daemon with location plug-in goes down, then all ProcessMonitor references no longer exist for all active target processes in the IMR. However when the Locator comes back up, it can recover. For each and every active target process, a new ProcessMonitor is created and the attribute in its corresponding Process is reset.

```
module IT_Activation
{
    interface ProcessMonitor
    {
        // Exceptions raised with this target process instance and
        // information found in the IMR.
        //
        exception ProcessNotExist { } ;
        exception ProcessNotActive { } ;
        exception ProcessAlreadyActive { } ;
```

```
        enum ProcessEventValue
        {
            STARTED,            // Target process was started
            NOT_STARTED,        // Target process was not started
            DIED                // Target process has died
        };
        // Announces a target process event to the location plug-in
        //
        void
        announce_process (
            in ProcessEventValue        event_type
        ) raises (
            ProcessNotExist,
            ProcessNotActive,
            ProcessAlreadyActive
        );
    } ; // End of Process Monitor Interface
};
```

(3) The Activator

The Activation plug-in provides an implementation of this interface. All Activator object instances are transient. The purpose of the Activator is to identify itself to one or more location plug-ins for target process activation to occur. There is only one Activator per activation plug-in. But note that the Activator may be registered with one or more Locators with the same name or a different name.

For any communications to occur in a location domain between the location plug-in and any activation plug-ins, each activation plug-in preferably registers itself with the location plug-in. Once registered, the Activator is stored on disk. The Activator List is a list of registered Activator(s) with a location plug-in for the location domain. The Activator List is managed by the location plug-in and resides in permanent storage. An entry in the Activator list contains an activator name, an Activator reference, and the owner of the entry. The activator name is unique within a location domain. If several Locators share an Activator, it may or may not be registered with the same name.

During a create_process( ) operation, the Activator performs validations on the input parameters sent. If these parameters are not valid, an InvalidConfiguration exception is returned to the client. If the path name of the executable process does not exist, an ExecutableNotFound exception is returned to the client. In addition, the next two paragraphs identify security violations.

The Activator preferably ensures that the security identity activating the target process has the proper access rights to do so. This security identity identifies the real user and real group IDs of a target process. Since all target processes exec-ed from the activation plug-in inherit the activation plug-in's real user and real group IDs, it is the responsibility of the Activator to ensure that the security identity configured in the target process's static IMR entry maps to the real user and real group ID of the activation plug-in. If not, an CORBA::NO_PERMISSION( ) exception is required to be sent back to the client.

In addition on UNIX, the activation plug-in preferably determines if the effective user and group IDs may have been given additional permissions via set-uid and/or set-gid bits on the ART daemon with the activation plug-in itself or the target process executable file. In this case, the real user and group IDs may map to the user and group IDs in the IMR but the effective user and group IDs may have been given additional permissions not intended by the entity that established the static target process IMR entry. If so, an CORBA::NO_PERMISSION( ) exception is required to be sent back to the client.

Once the above validations are successful, then the activation plug-in creates a Process representing the target process and stores the ProcessMonitor in it. If the create_process( ) operation is specified with the NO_WAIT option, the activation plug-in immediately returns the Process to the location plug-in and adds the Process to its in-memory Process list. For the NO_WAIT option, this is done before actually creating and starting the target process on the host. In this case, the notification of target process activation is via the ProcessMonitor. If activation is not successful, the activation plug-in implicitly removes the Process object.

If the create_process( ) operation is specified with the WAIT option, then the Locator waits for the Activator to actually create and start the specified target process on the host. If successful, the activation plug-in returns the Process representing the target process to the location plug-in and adds the Process to its in-memory Process list. If not, a CreateProcessFailed or StartProcessFailed exception is raised and a null value is returned. If the WAIT option is chosen, the IT_Activaiton::ProcessMonitor::announce process (STARTED/NOT_STARTED) are not called as the create_process( ) operation returns successfully or raise an exception.

The WAIT/NO_WAIT option on the create_process( ) operation is determined by the Locator. During a client request invocation, the Locator will use the WAIT option to start a target process. However at Locator start-up time, the Locator may make several requests to several Activators to start target processes with the NO_WAIT option.

If there is a rate-limit specified in the static IMR entry for the target process, the Locator may invoke create_process( ) operation one or more times. For each unsuccessful startup attempt, the activation plug-in implicitly removes the Process object. If the number of attempts exceeds the maximum number of retries configured in a target process static IMR entry, the troublesome exception is required to be returned to the client.

```
module IT_Activation
{
    interface Activator
    {
        exception ExecutableNotFound { } ;
        exception CreateProcessFailed { } ;
        exception StartProcessFailed { } ;
        exception InvalidConfiguration { } ;
        // Activator attributes
        //
        readonly attribute string host;
        readonly attribute string user;
        readonly attribute string group;
        // Creates and returns an object reference representing the process.
        // This operation is also used to retry a failing target
        // process. It is the responsibility of the caller to
        // remove the Process when no longer required.
        //
        Process
        create_process (
            in IT_LocationCommon : : StartUpInformation startup
information,
            in ProcessMonitor        callback,
            in boonlean              wait_for_completion
        ) raises (
            ExecutableNotFound,
            InvalidConfiguration,
            CreateProcessFailed,
            StartProcessFailed,
        ) ;
    }; // End of Activator Interface
};
```

(4) The Activator Registry

Figure 3:
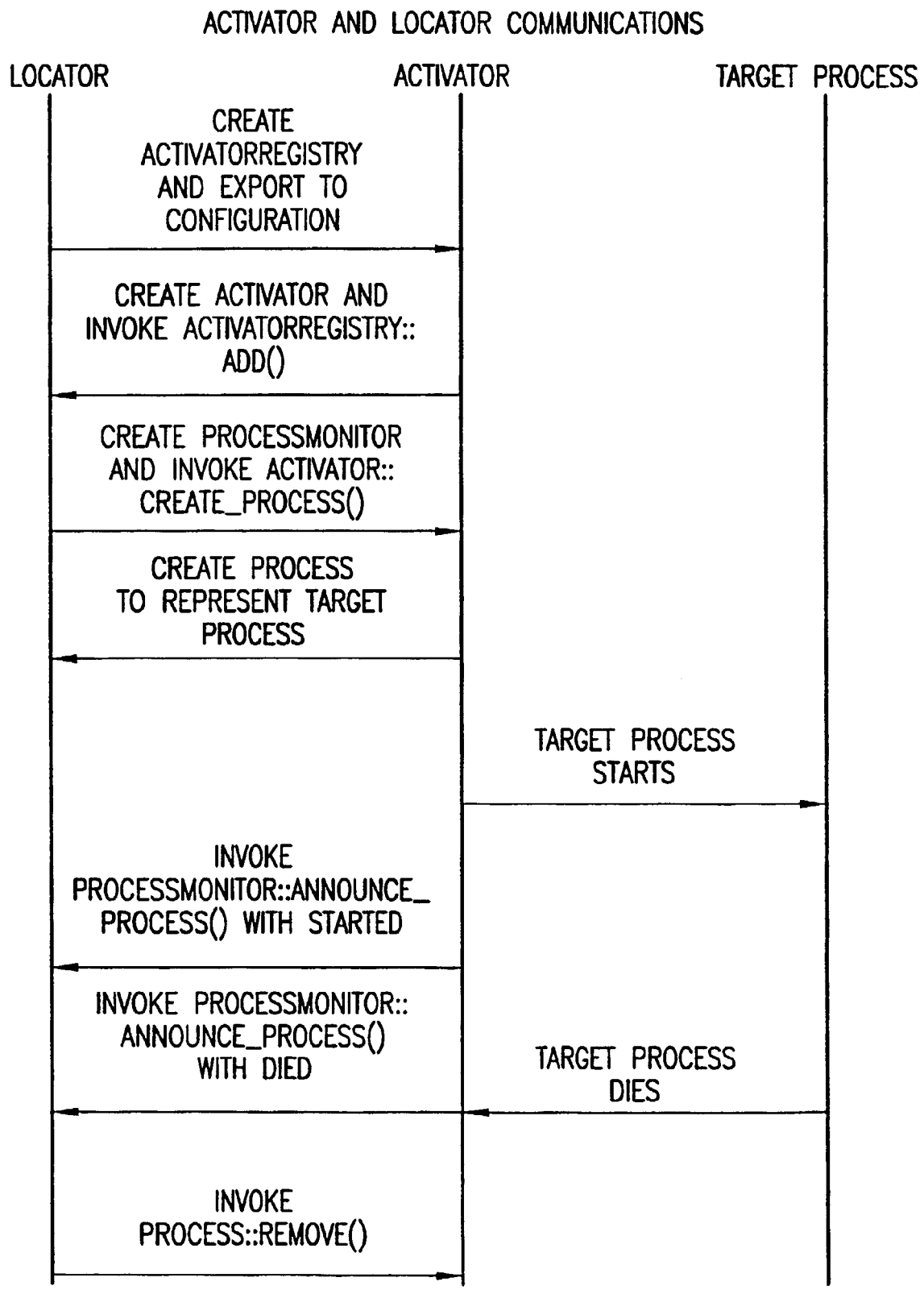
FIG. 3 is a diagram illustrating communication among a locator, activator and target process.
Figure 4:
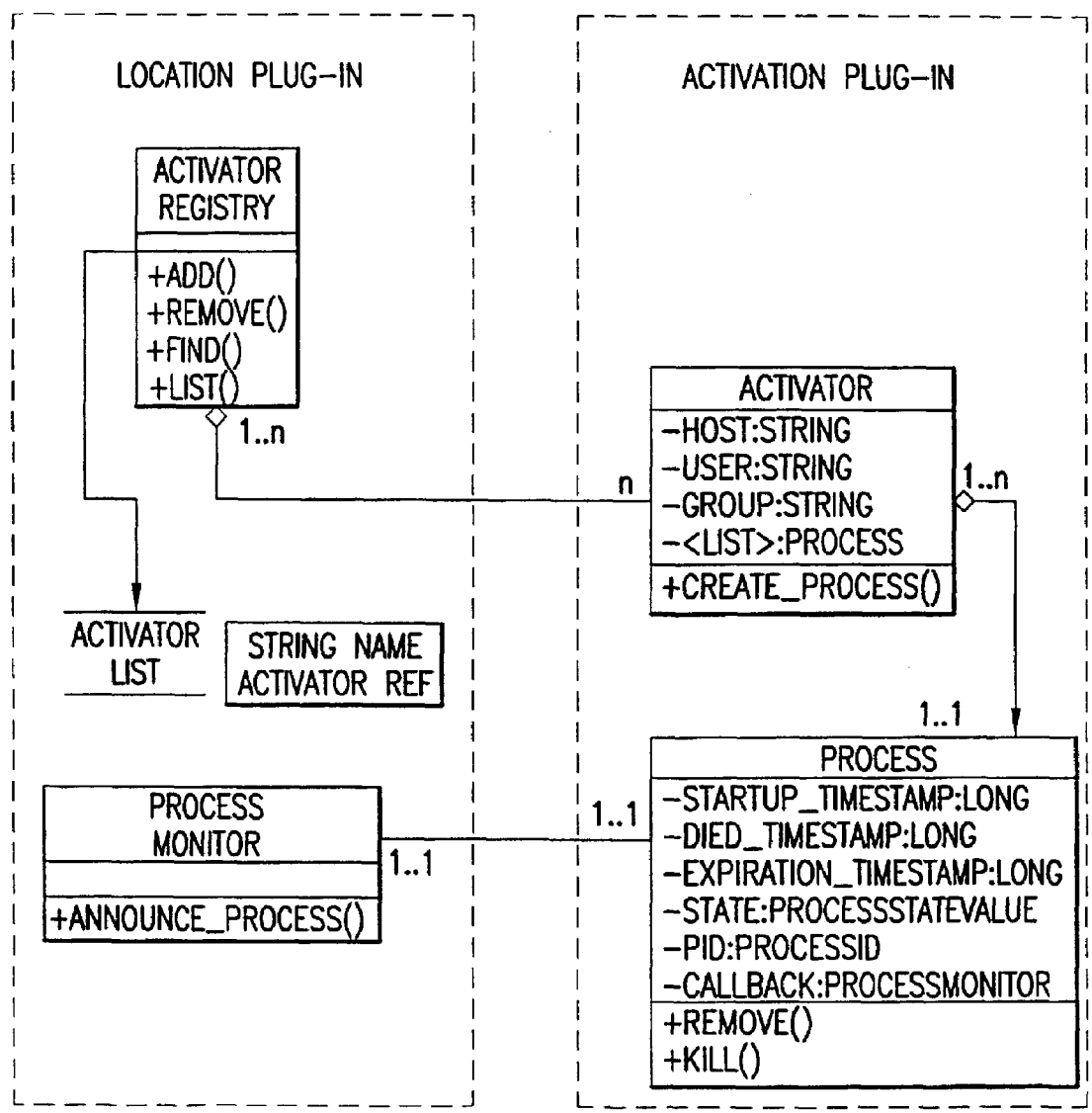

Referring to FIGS. 3 and 4, the Location plug-in provides an implementation of this interface. Preferably, there is only one Activator Registry per Locator. Also note that one or more Activator Registrys may be available to an activation plug-in if several Locators share an activation plug-in. The purpose of the Activator Registry is to provide a means for an activation plug-in to dynamically register with a Locator.

When a generic daemon with the activation plug-in is first started, it will obtain an object reference to this interface via some configuration mechanism. The activation plug-in will create an Activator and register it with the location plug-in. Once an Activator is registered, the location plug-in will search the static target process IMR entries in the IMR for those target processes configured with the same Activator name and a start-up option of always, which indicates that the target process is required to be up and running at all times. If a target process is determined to be no longer active, then the locator implicitly sends create_process( ) request to the activation plug-in. As a result at Activator registration time, there may be several requests to start target processes. This provides support for those instances when the host where the activation plug-in resides goes down.

The following actions provide support for the rare case when only the generic daemon with an activation plug-in goes down and not the entire host. If a generic daemon with an activation plug-in is not gracefully shutdown, its Activator may still be registered with a location plug-in. If the location plug-in attempts to use an Activator and receives an OBJECT_NOT_EXIST, the location plug-in will implicitly remove the Activator from the Activator List. However, if the activation plug-in is restarted and attempts to register with the location plug-in again and there is a matching Activator name attribute in the Activator List, the location plug-in can implicitly try to use the already registered Activator. If the location plug-in receives an OBJECT_NOT_EXIST, it will implicitly remove this Activator and allow registration of the new Activator. Otherwise, the activation plug-in will receive an ActivatorAlreadyRegistered exception.

```
module IT_Activation
{
    interface ActivatorRegistry
    {
        // The Entry is the unit of information managed by the registry
        // for a given Activator instance. The "name" is the admini-
        // strative name used for the Activator. It is used by the location
        // daemon to decide which of multiple Activator instances running
        // on a particular host machine to be used to start a given server
        // process. The "owner" is the security ID of the Activator itself.
        // This value is used to ensure that only administrators or the
        // Activator itself may modify specific information related
        // to the Activator instance.
        //
        struct Entry
        {
            string                              name;
            Activator                           activator_ref;
            IT_LocationCommon : : SecurityId    owner;
        } ;
        typedef sequence <entry> EntryList;
        exception ActivatorAlreadyRegistered {
            Entry activator_entry;
        } ;
        exception ActivatorNotRegistered {
            string name;
        };
        // Register the existence of the indicated Activator instance with
        // the Location daemon.
        //
```

-continued

```
    void
    add (
        in Entry activator_entry
    ) raises (
        ActivatorAlreadyRegistered
    );
    // Unregister the indicated Activator instance with the location
    // daemon.
    //
    void
    remove (
        in string name
    ) raises (
        ActivatorNotRegistered
    );
    // Return the information about the Activator instance registered
    // with the Location daemon specified by the provided "name"
    //
    boolean
    find (
        in      string      name,
        out     Entry       activator_entry
    );
    // Return a list of the Activator instances registered with the
    // location daemon.
    //
    EntryList
    list ( );
}; // End of Activator Registry Interface
};
```

3. Other Aspects of Art Activator

In the rare case when only the generic daemon with an activation plug-in goes down and not the entire host, then all Process references are invalid in the IMR. Once the Activator comes up it cannot monitor those target processes that it had previously created and started but they may still be running on that host. In addition, a Locator may send a request to start a target process that is already running once the Activator re-registers.

In order to solve the above described problem, the present invention provides:

The Activation plug-in keeps persistent information about the target processes it has started.

Process is created as a persistent rather than a transient object.

The Locator gets a POACallback via an announcement that a POA with a persistent lifespan policy was created. The Locator can determine if a target endpoint is still active for the associated target process via is_active( ) operation on the POACallback. If one target endpoint is active, then its associated target process is still active. Then the issue is, which target endpoint does the Locator choose if no target endpoints for a target process were configured for a heartbeat purpose. A configuration requirement can be made such that one target endpoint is configured for the heartbeat feature per target process.

In order to ensure that a Locator is talking to an Activator, the present invention provides:

The Activator can be made only to accept requests to create a process from a locator that the activator knows about from it's own configuration. So, the activator's configuration can have a list of locator IORs to register with. This IOR can have a TAG_SEC_NAME containing the Security Name of the locator. The activator verifies the Security Name of the client every time create_process( ) is called. (The Security Name can be obtained from SecurityCurrent.get_attributes( ))

Providing dynamic registration and/or registering Activators via some Configuration mechanism is contemplated within the present invention. This will determine persistent or transient object for Activator registration.

A management interface to register Activators with Locators can also be provided in the present invention.

Furthermore, ITActivation::Process::ProcessId can be a string making it more portable across various platforms.

II. Art Activator Plug-in

As discussed above, for ART, activation functionality will be implemented as a plug-in to a generic ART daemon. The activation plug-in is responsible for activating a target process and has no persistent data to manage. A target process is an executable process containing one or more target endpoints.

In this section the activator is defined as:

Responsible for launching target processes

Responsible for monitoring all child processes

Responsible for informing the Locator about any events relating to such child processes (e.g. in particular informing the Locator if a process dies).

Responsible for Java in-process activation or other future extensions. This is achieved via the "path name" specified for target process configuration. For example, "java.exe foo"

NOT responsible for the management of any processes launched by previous Activators.

NOT responsible for the monitoring and care-taking of manually activated processes.

NOT responsible for informing specific interested parties (ProcessMonitor) about any process specific events.

NOT responsible for any process check-pointing. Check-pointing is done within the Locator.

NOT required to kill child processes if a SIGTERM is received.

Not responsible for the direct management of process references (namely the immediate deletion of process references that have died).

Further, it is assumed that:

Once an Activator starts up, it is able to register its endpoints with a Locator. It may need to register with multiple configured locators.

If the Locator goes down during a process launch (or process kill), and the Activator cannot respond to the Locator, then Activator only logs (audit) the fact that it could not respond to the Locator's launch request. It is assumed that the Locator will be responsible for deleting Process objects.

Only the locator that called launch will have the object reference for the Process and so only that locator can invoke the kill( ) operation.

The Activator reads a configuration file that defines the whereabouts of allowed Locators (i.e. the IOR of the Locators).

There will be a configuration option to decide how long a Process in the NOT_STARTED/DIED state should stay in the activator. That the Activator will clean-up any old process object references whose time of death is greater than the NOT_STARTED/DIED values.

If an Activator dies, then its child processes do NOT necessarily die.

The Locator sending a request to start a process that is already running is a Locator problem.

The Activator will only accept requests to create a process from a locator that the activator knows about from it's own configuration. So, the activator's configuration will have a list of locator IORs to register with.

1. Object Model (1) Object Descriptions

Figure 5:
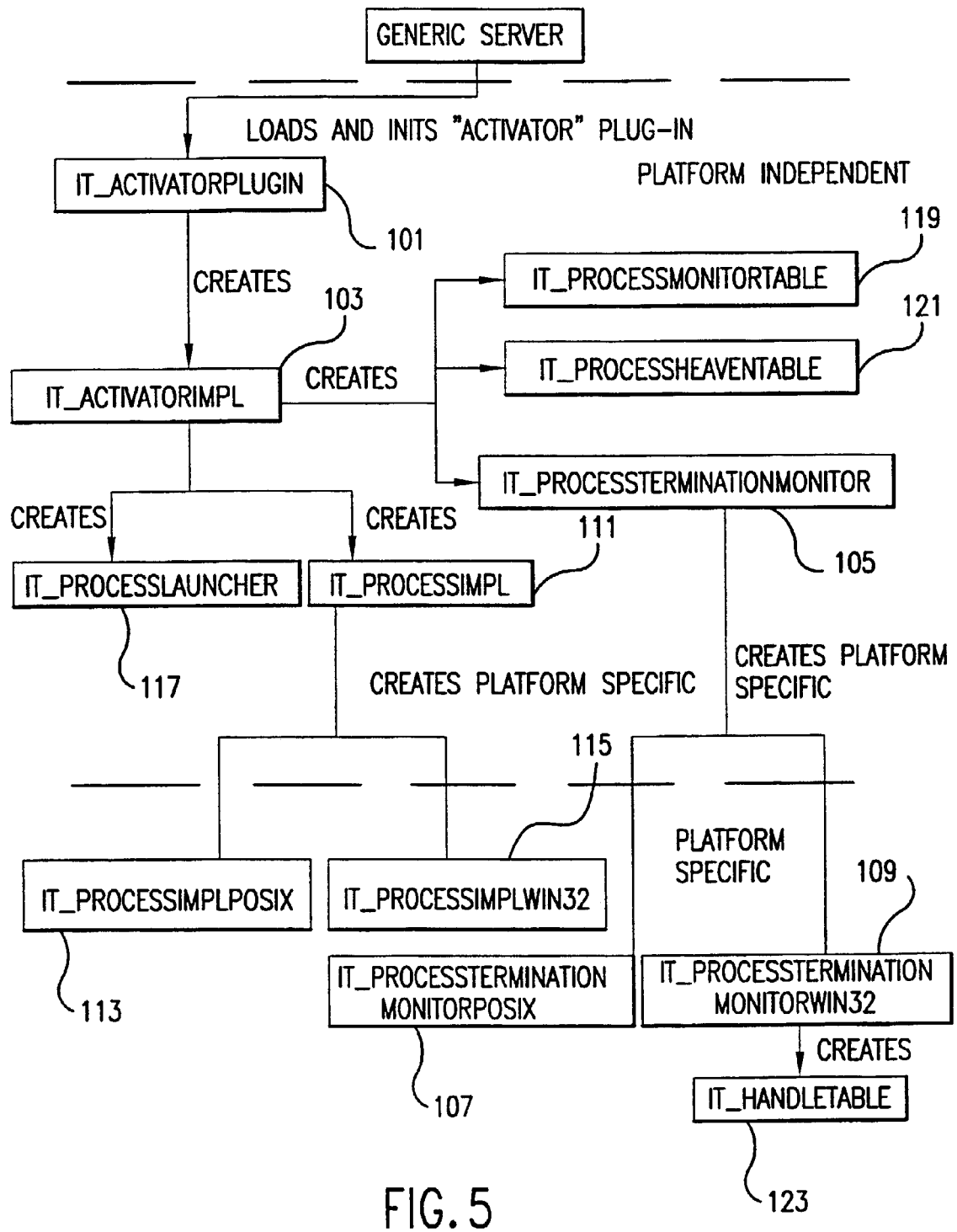
FIG. 5 is a diagram illustrating a class hierarch of an object of the present invention.

Referring to FIG. 5, the Activator plug-in of the present invention includes the following:

IT_Activator PlugIn, 101

This object represents an extension of the main( ) function in the Generic Server that is specific to the Activator plug-in. It is responsible for creating an Activator-specific transient POA from the RootPOA and creating and registering the Activator servant with it. In addition, this object registers the Activator with one or more Locator(s).

IT_ActivatorImpl, 103

This is the implementation object for the Activator IDL interface. Only one instance of this object exists. It is responsible for creating the main Activator objects and handling requests for target process activation.

IT_ProcessTerminationMonitor, 105

This object is known as the "monitor thread" and is responsible for monitoring the processes launched by the Activator.

IT_ProcessTerminationMonitorPosix, 107

For POSIX, an instance of this object is created with every IT_ProcessTerminationMonitor creation. For POSIX, there is only one "monitor thread".

IT_ProcessTerminationMonitorWin32, 109

For Win32, an instance of this object is created with every IT_ProcessTerminationMonitor creation. For Win32, there may be one or more "monitor thread(s)".

IT_ProcessImpl, 111

This is the implementation object for the Process IDL interface. An object reference is passed back to the target process activation requester so it can invoke Process::remove( ) on it. It is passed to the monitoring activity so a monitoring activity can monitor it and handle its termination. The present invention includes POSIX and Win32 versions of this object.

IT_ProcessImplPosix, 113

For POSIX, an instance of this object is created with every new IT_ProcessImpl creation.

IT_ProcessImplWin32, 115

For Win32, an instance of this object is created with every new IT_ProcessImpl creation.

IT_ProcessLauncher, 117

Given the IT_ProcessImpl reference, this object is known as the "launch thread" and is responsible for launching the target process.

IT_ProcessMonitorTable, 119

This object contains those Process (es) that are being monitored by one or more "monitor thread(s)". There is only one instance of this object. Note that a Process will only be in either the IT_ProcessMonitorTable or the IT_ProcessHeavenTable.

IT_ProcessHeaven Table, 121

This object contains those Process(es) that have died and are no longer being monitored. There is only one instance of this object.

IT_HandleTable, 123

For Win32 only, this object contains those Process (es) that are being monitored by a particular "monitor thread". The Win32 API for monitoring handles only supports 64 handles at one time.

(a) IT_ActivationPlugIn Class

Figure 6:
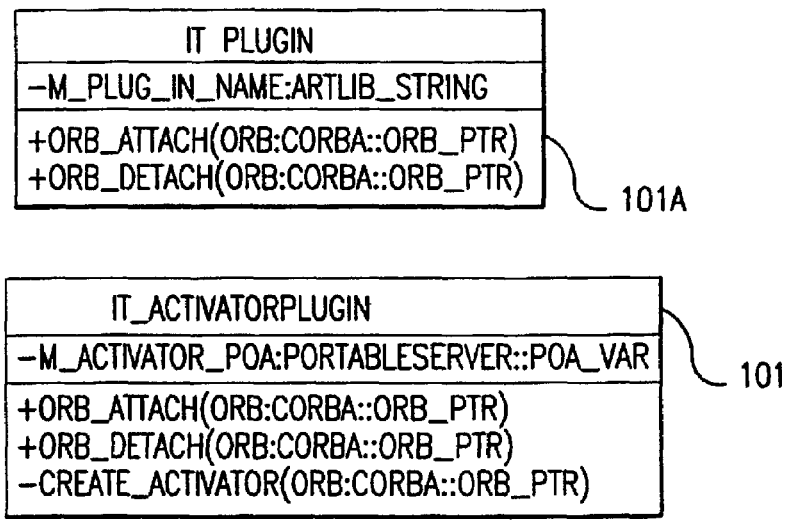
FIG. 6 is a diagram illustrating a class hierarch of an IT_Activator PlugIn class.

Referring to FIG. 6, the IT_ActivationPlugIn object represents an extension of the main( ) function in the Generic Server that is specific to the Activator plug-in. It is responsible for creating an Activator-specific transient POA from the RootPOA and creating and registering the Activator servant with it. In addition, this object registers the Activator with one or more Locator(s).

The IT_Activator PlugIn 101 is derived from ITPlugIn 101A [PLUGIN]. Via the Generic Server, this plug-in is loaded and initialized after all ORB related plug-ins are initialized and loaded. The plug-in name used for the Activator plug-in is "Activator".

(b) IT_ActivatorImpl Class

Figure 7:
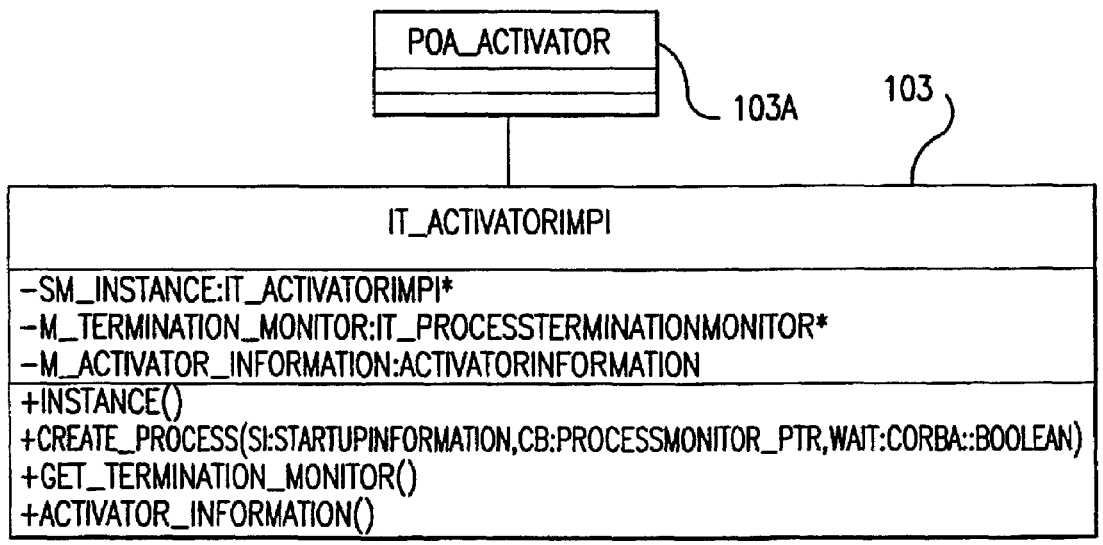
FIG. 7 is a diagram illustrating a class hierarch of an IT_ActivatorImpl class.

Referring to FIG. 7, the IT_ActivatorImpl 103 is the implementation object for the Activator IDL interface. Only one instance of this object exists. It is responsible for creating the main Activator objects and handling requests for target process activation.

The IT_ActivatorImpl 103 is derived from POA_Activator 103A and is the main driver for the activation plug-in. The IT_Activator PlugIn 101 creates this singleton at orb-attach( ) time before any launcher and monitor threads are created and/or started. As a result, two threads will not attempt to create this singleton. The IT_Activator PlugIn 101 deletes this singleton at orb_detach ( ) time.

(c) IT_ProcessTerminationMonitor Related Classes

Figure 8:
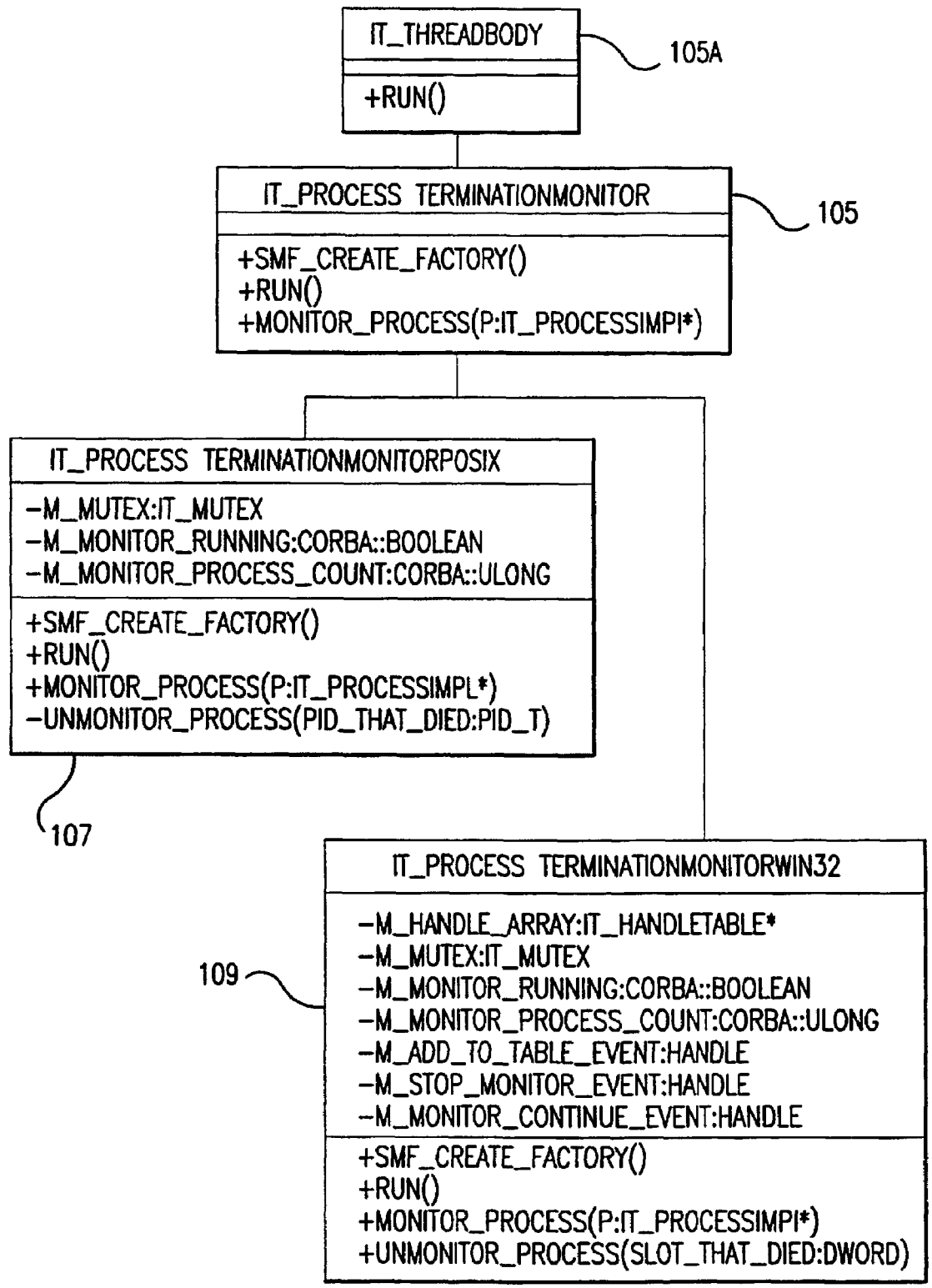
FIG. 8 is a diagram illustrating a class hierarch of an IT_ProcessTerminationMonitor class.

Referring to FIG. 8, the IT_ProcessTerminationMonitor class 105 object is known as the "monitor thread" and is responsible for monitoring the processes launched by the Activator.

The IT ProcessTerminationMonitor 105 class is derived from IT_ThreadBody 105A. A static factory function, smf_create_actor( ), is used for creating the platform specific instances of this class. The IT_ActivatorImpl 103 class is responsible for creating this object.

Generically speaking, the monitor thread itself is started only if there are processes to be monitored. This object uses a mutex to determine if the monitor is running. In addition, this object adds the IT_ProcessImpl to the IT_ProcessMonitorTable when a successful target process activation occurs and enters an infinite loop waiting on certain events. In the event of process death, this object removes the IT_ProcessImpl from the IT_ProcessMonitorTable and adds it to the IT_ProcessHeavenTable. The IT_ActivatorImpl deletes this object at orb detach( ) time.

IT_ProcessTerminationMonitor Posix Class

For POSIX, an instance of this object is created with every IT_ProcessTerminationMonitor 105 creation. For POSIX, there is only one "monitor thread". This monitor thread uses the process monitor table, IT_ProcessMonitorTable 110, for all target processes started by the Activator and that are currently running. The waitpid( ) system call is used to wait on process death.

IT_ProcessTerminationMonitorWin32 Class

For Win32, an instance of this object is created with every IT_ProcessTerminationMonitor 109 creation.

On Win32, there may be one or more monitor threads. Each monitor thread manages its own handle table, IT_Handle-Table 123, consisting of its own event handles and process handles. A handle table can be configured to monitor about 62 processes.

Note that ALL monitor thread(s) share the process monitor table IT_ProcessMonitorTable 119 for all target processes started by the Activator and that are currently running. So as to provide three monitor threads with one having 62 processes, another having 62 processes, and another having one process. But the process monitor table includes all 125 processes. The WaitForMultipleObjects ( ) system call is used to wait on any handle event.

(d) IT_ProcessImpl Related Classes

Figure 9:
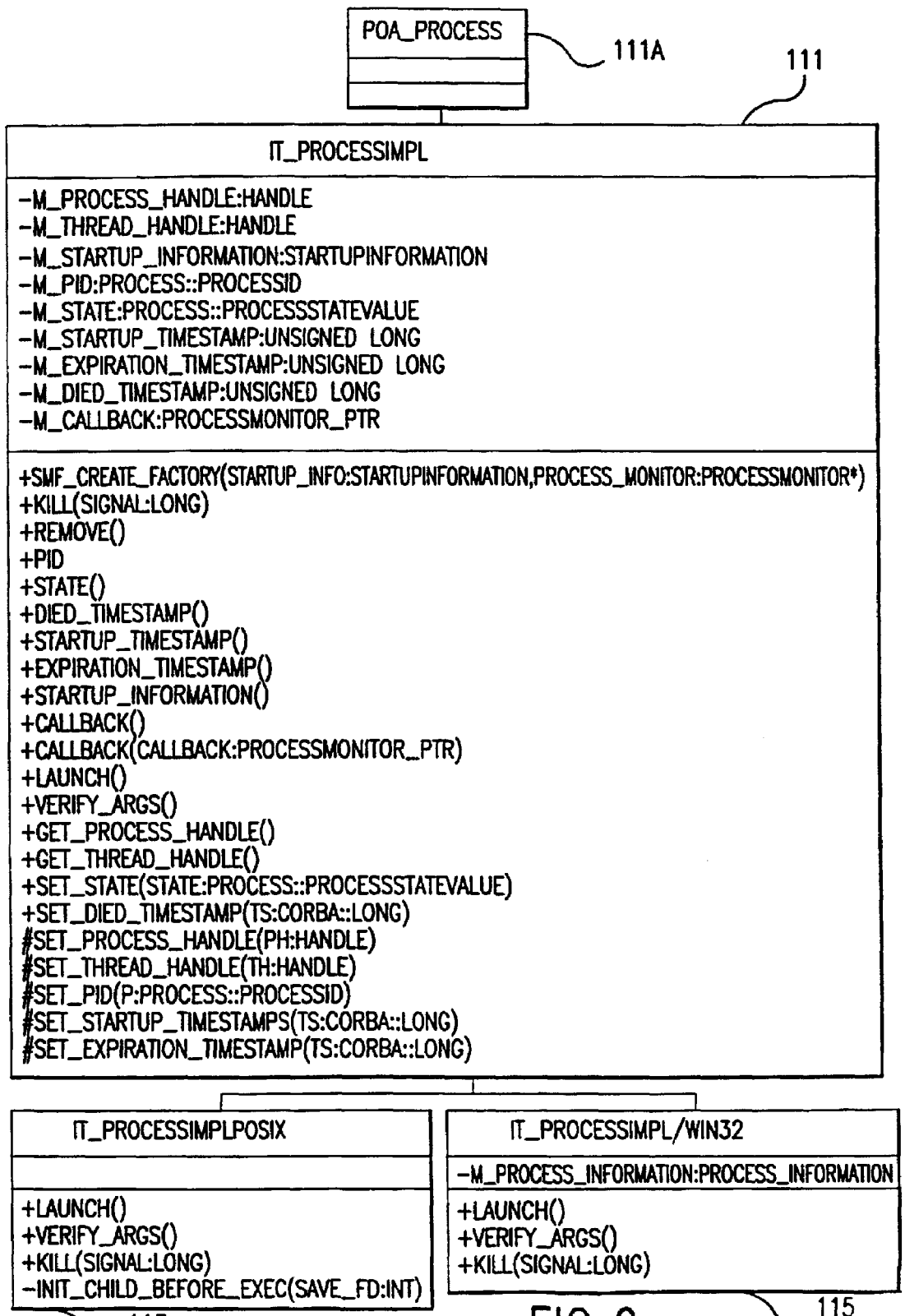
FIG. 9 is a diagram illustrating a class hierarch of an IT_ProcessImpl class.

Referring to FIG. 9, IT_ProcessImpl class 111 class is the implementation object for the Process IDL interface. An object reference is passed back to the target process activation requestor so it can invoke Process::remove ( ) on it. It is passed to the monitoring activity so a monitoring activity can monitor it and handle its termination.

The IT_ProcessImpl 111 class is derived from POA_Process 111A. A static factory function, smf_create_factory ( ), is used for creating the platform specific instances of this class. The IT_ActivatorImpl 103 class is responsible for creating this object at create process ( ) time.

The target process activation requestor is responsible for deleting this object. Note that this object can not be deleted if it is not in a Process::RUNNING or Process::STARTING_PROCESS state. This object is then removed from the IT_ProcessHeavenTable 121. There is also an expiration timestamp on all process objects so that the Activator itself can clean up after a configured period of time.

IT_ProcessImplPosix Class

For POSIX, an instance of this object is created with every new IT_ProcessImpl 111 creation. At launch( ) time, this object performs a fork ( ) and exec ( ). If fork( ) failed, no pid exists so the process object is deleted implicitly by the IT_ProcessLauncher and an exception is returned to the caller. Note that a waitpid( ) operation is not performed. To determine an exec( ) failure, this class creates a unidirectional pipe for communications between parent and child processes. If exec( ) fails, the child process sends a message to the parent process.

If exec( ) fails, a pid exists so a waitpid( ) operation is performed to avoid being marked as <defunct>. Note that the child process calls exit( ) and an exception is returned to caller. Since the child process dies, the monitor thread ignores it since it was never in a Process::RUNNING state. But the IT_ProcessLauncher cleans up the process object implicitly. If the fork( ) and exec( ) are both successful, the process object is now monitored by the IT_ProcessTerminationMonitor Posix. At kill( ) time, this object performs a kill( ) system call only if the process is in a Process::RUNNING state.

IT_ProcessImplWin32 Class

For Win32, an instance of this object is created with every new IT_ProcessImpl creation. At launch( ) time, this object performs a CreateProcess( ) system call. If CreateProcess( ) failed, no pid exists so the process object is deleted implicitly by the IT_ProcessLauncher and an exception is returned to the caller. Note that a wait operation is not performed. If the CreateProcess( ) is successful, the process object is now monitored by the IT_ProcessTerminationMonitorWin32.

At kill( ) time, this object performs a Terminateprocess( ) system call only if the process is in a Process::RUNNING state.

(e) IT_ProcessLauncher Class

Figure 10:
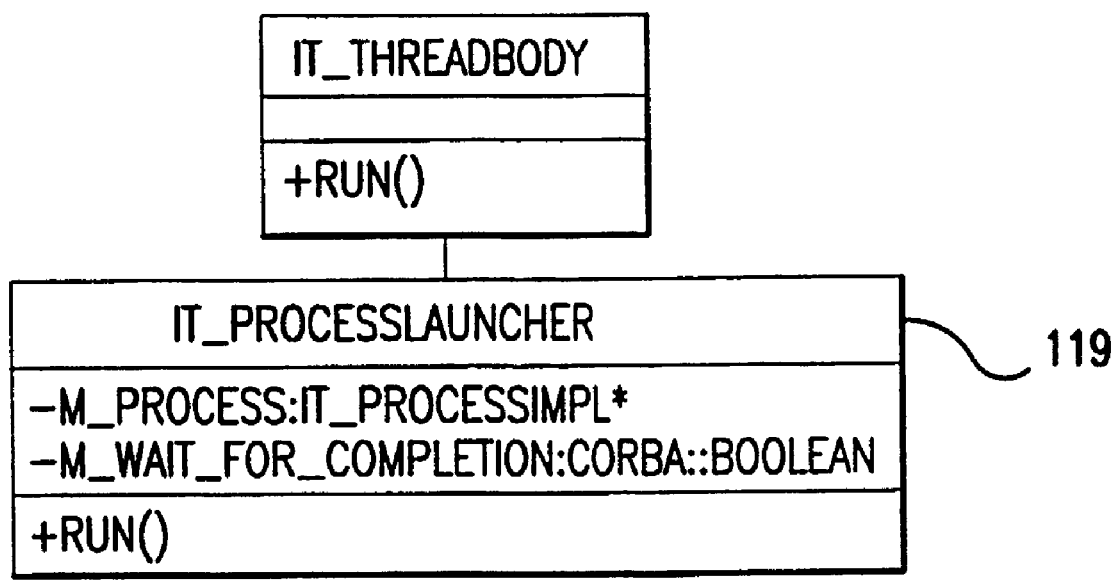
FIG. 10 is a diagram illustrating a class hierarch of an IT_ProcessLauncher class.

Referring to FIG. 10, given the IT_ProcessImpl reference, this object is known as the "launch thread" and is responsible for launching the target process. The IT ProcessLauncher class is derived from IT_ThreadBody. The IT_ActivatorImpl class is responsible for creating this object at CreateProcess( ) times. The IT_ProcessLauncher invokes IT_ProcessImpl:: launch( ) to start the target process. If the wait_for_completion flag is specified on create_process( ), then a "launch thread" is started by IT_ActivatorImpl and the requestor is notified of target process activation via the ProcessMonitor.

Internal Tables

Figure 11:
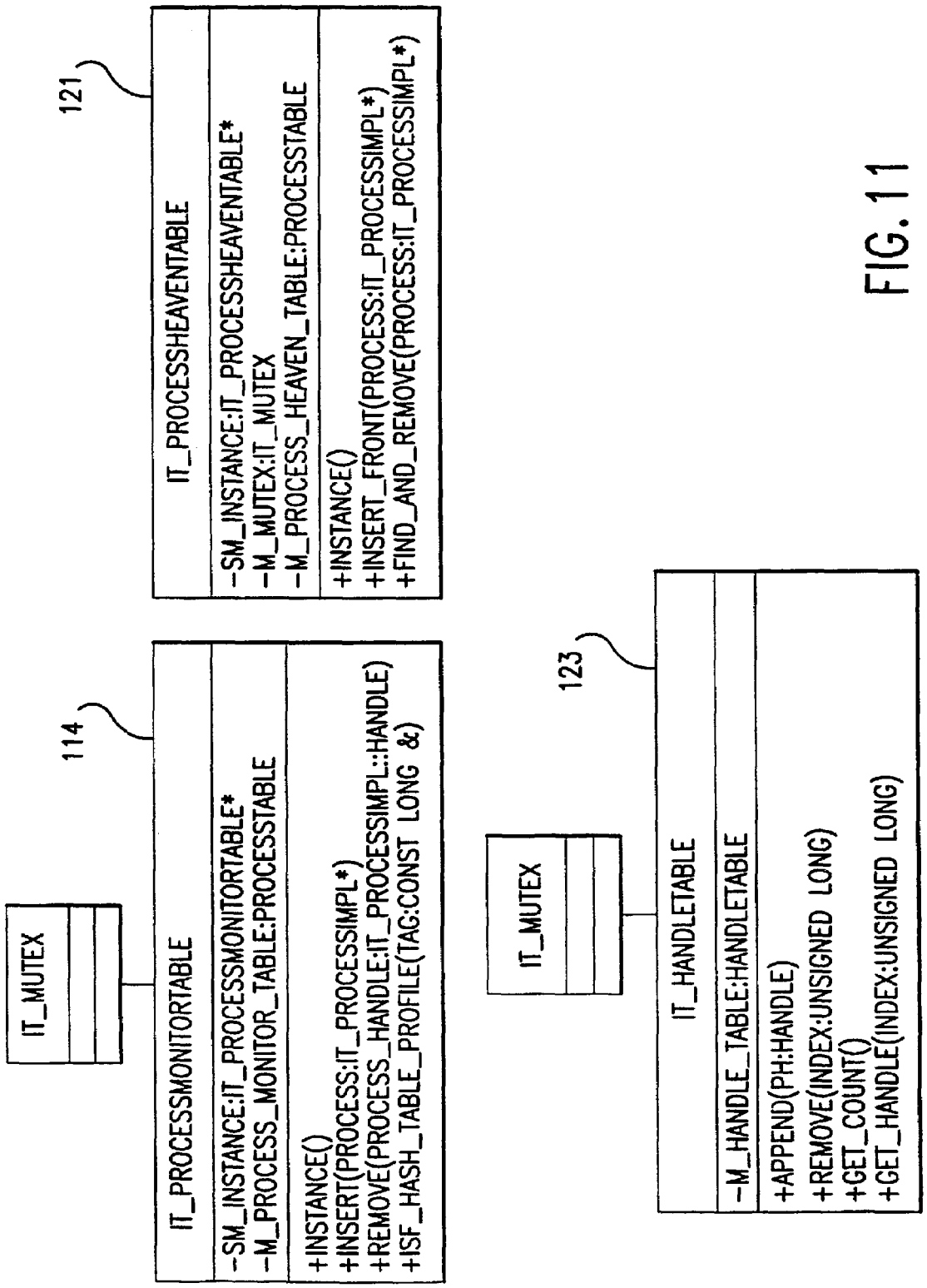
FIG. 11 is a diagram illustrating a class hierarch of internal tables of the present invention.

Details of internal tables are discussed by referring to FIG. 11.

IT_ProcessMonitorTable, 119

This object contains those Process (es) that are being monitored by one or more "monitor thread(s)". Note that a Process will only be in either the IT_ProcessMonitorTable or the IT_ProcessHeavenTable. There is only one process monitor table in the Activation plug-in. This singleton is created at ORB attach time and deleted at ORB detach time by IT_ActivatorImpl. This table is implemented as a hash table whose hash key is IT_ProcessImpl::ProcessHandle. The IT_ProcessImpl::ProcessHandle is guaranteed to be unique among all "live" processes whether on a POSIX or Win32 platform.

The locking model used on the IT_ProcessMonitorTable forces locking and unlocking the table to be performed explicitly. This is due to the fact that attributes of the process object may be modified during remove operations.

IT_ProcessHeaven Table, 121

This object contains those Process(es) that have died and are no longer being monitored. Note that a Process will only be in either the IT_ProcessMonitorTable or the IT_ProcessHeaven Table. There is only one process heaven table in the Activation plug-in. This singleton is created at ORB attach time and deleted at ORB detach time by IT_ActivatorImpl. This table is implemented as a doubly linked list.

After the death of a target process, its Process object is placed on the process heaven table. The Process object is inserted onto the front of the process heaven table. This may help performance if the assumption is that most Activator:: create_process( ) requestors will request to delete the Process object soon after its associated target process dies. Here, the Process object merely sits until it is removed by its Activator:: create_process( ) requestor.

Once a target process dies, its pid is not ensured to be unique. The operating system can, at any time, re-use pids. As a result, the process heaven table may have Process objects with duplicate pids. The criteria for removing a Process object from this table is the following: pid, startup timestamp, and died timestamp. All three attributes must match. Locking is required due to the fact that the monitor thread will be adding Process objects to this table. Note that locking is performed implicitly so that callers do not have to.

IT_Handle Table, 123

For Win32 only, this object contains those Process (es) that are being monitored by a particular "monitor thread". The Win32 API for monitoring handles only supports 64 handles at one time. The handle table is only required for the Win32 implementation. This table is created at ORB attach time and deleted at ORB detach time when the Termination Monitor thread is created/deleted.

This table is implemented as a compact array due to the Win32 wait API which limits the number of handles it can wait for (MAXIMUM_WAIT_OBJECTS) and the fact that no fragmentation can exist in the wait API's parameter, the handle array table. The locking model used on the IT_HandleTable forces locking and unlocking the table to be performed explicitly. This is due to the fact that the monitor thread will be reading the handle table while some launch threads may be adding HANDLEs to this table. One IT_HandleTable monitors only 62 process handles. The first two slots of the IT_Handle_Table are occupied by two event handles. The AddToTable event will always reside in slot 0. The StopMonitor event will always reside in slot 1. The AddToTable and StopMonitor events are never removed from the handle table until the handle table is no longer needed.

III. Implementation Repository

This section describes the internal design and administrative interface to the Implementation Repository (IR). The IR is used to register and store the static data describing server processes and OA specific information needed by the location daemon to determine the correct server process for handling incoming location requests. This document describes both the QA independent information stored in the IR as well as the POA specific information.

The Implementation Repository is an entity used by the location daemon to maintain and manage the persistent, static, data for identifying server processes and the information needed to map an incoming location request to the appropriate server process. The data in the IR identifies such things as the executable file to use for a particular server process and the host to run it on, the command line switches to pass to the executable on process startup and the environment variables that need to be set. An IR consists of an OA independent portion, which contains information about server processes and ORB instances, and an OA specific portion that is used to map an incoming location request to the proper server process. The following sections describe how this information is managed by an IR. We need to do something when an IR instance gets loaded into the Locator to validate that Ids that are unique across the entire Locator are truly unique.

1. IR Management

Figure 12:
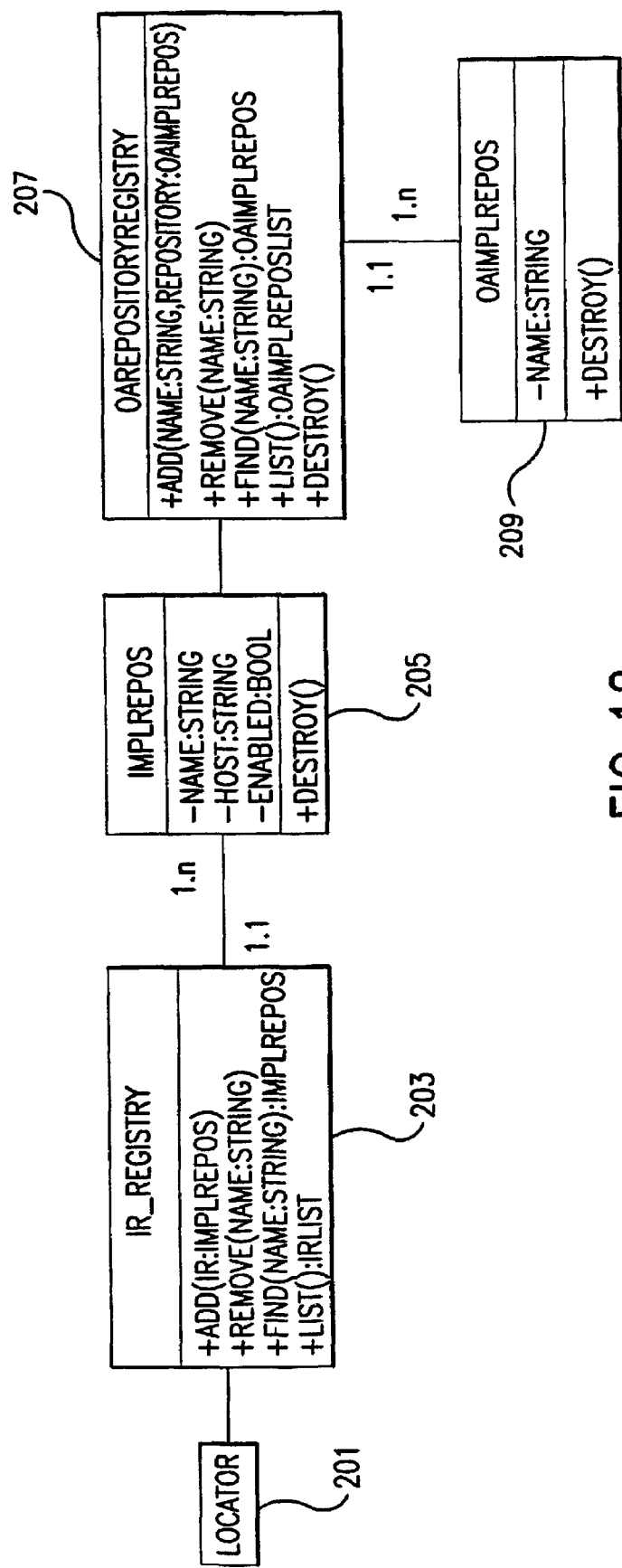
FIG. 12 is a diagram illustrating IR management interfaces.

Referring to FIG. 12, a location daemon 201 may have more than one IR instance associated with it at any given time. The Locator 201 uses an IRRegistry 203 for managing its associated IR instances. A given IR instance may have one or more OA specific repositories with which it is associated. These repositories manage the information required by that OA's location plug-in used to map an incoming location request to the appropriate server process. The IR uses an OARepositoryRegistry to manage these OA specific repositories. Refer to FIG. 1 for the following description of these interfaces.

(1) IRRegistry Interface

The IRRegistry 203 is responsible for management of IR instances associated with the Locator 201. Each IR instance has an associated name which must be unique relative to the IRRegistry 203.

```
module IT_IR
{
  interface IRRegistry
  {
    void
    create (
      in ImplementationRepository ir
```
    ) raises (IRAlreadyExists);
    void
    remove (
      in string ir_name
    ) raises (IRNotExist);
    ImplementationRepository
    find (
      in string ir_name
    );
    IRList
    list ( )
  };
};
```

The add ( ) operation registers the IR instance specified by ir. If an IR instance is already registered with the same name attribute as the instance being added, the IRAlreadyExists exception is raised. The remove ( ) operation unregisters the association with the specified ir_name from the registry. If there is no IR instance registered with the specified ir_name, the IRNotExist exception is raised. The find ( ) operation returns a reference to the IR instance specified by ir name. If there is no IR instance registered with the specified ir_name, a NULL object reference is returned. The list ( ) operation returns a list of all IR instances registered with the registry.

(2) ImplementationRepository Interface

An ImplementationRepository 205 is responsible for management of the OA independent information needed by the location daemon to map incoming location requests to the appropriate server process. An IR instance will have one or more OA specific repositories associated with it that are responsible for maintaining that particular OA's static location information. The IR can be a persistent object reference.

```
module IT_IR
{
  interface ImplementationRepository
  {
    attribute       string          name;
    attribute       boolean         enabled;
    readonly attribute  string      host;
    readonly attribute  ProcessConfigRegistry
                                    process_registry;
    readonly attribute  OARepositoryRegistry
                                    oa_repository_registry;
    void
    destroy ( );
  };
};
```

The name attribute is used to identify this IR instance. It is unique relative to the IRRegistry in which it is registered. The enabled attribute is used to enable or disable this IR instance. When an IR instance is disabled, none of its static persistent data is used by the location daemon for processing incoming requests.

The host attribute is informational only. It indicates the name of the host machine where the IR exists. It is used as an aid to administrators in knowing where various resources are allocated. The process registry attribute returns a reference to the ProcessConfigRegistry instance associated with this IR instance.

The oa_repository registry attribute returns a reference to the OARepositoryRegistry instance associated with this IR instance. The destroy ( ) operation iterates through this IR instances list of associated OAImplementationRepository instances calling destroy( ) on each and the persistent data associated with this instance is deleted and removed.

(3) OARepositoryRegistry

An OARepositoryRegistry 207 is used by the IR to manage its set of associated OA specific repositories. It is simply a map of OA repository name to abstract OAImplementation-Repository.

```
Module IT_IR
{
  interface OARepositoryRegistry
  {
    void
    add (
      in string                        oa_name,
      in OAImplementationRepository    repository
    ) raises (OARepositoryAlreadyExists);
    void
    remove (
      in string oa_name
    ) raises (OARepositoryNotExist);;
    QAImplementationRepository
      find(
        in string oa_name
      );
    OAImplementationRepositoryList
    list ( );
    void
    destroy ( );
  };
};
```

The add ( ) operation adds an instance of an OAImplementationRepository 207 to the list of OA repositories associated with the IR instance. The repository is mapped to the provided oa_name. If an OA repository is already registered with the oa_name, the OARepositoryAlreadyExists exception is raised.

The remove ( ) operation disassociates the specified OA repository from this

IR instance. If the specified OA repository is not registered with this IR instance the OARepositoryNotExist exception is raised. The find ( ) operation returns a reference to the OA repository specified by oa_name. If no OA repository is registered with the specified oa_name, a NULL object reference is returned. The list ( ) operation returns a list of all the OA repository instances associated with this IR instance. The destroy ( ) operation iterates through all of the associated OA repository instances and calls their destroy ( ) operation and disassociates it from this IR instance.

(4) OAImplementationRepository

An OAImplementationRepository 209 interface is a simple abstract interface to an OA specific repository. It can be a persistent object.

```
module IT_IR
{
  interface OAImplementationRepository
  {
  attribute string name;
  void
  destroy( );
  };
};
```

The name attribute is the name used for this OA repository and must be unique relative to the OARepositoryRegistry.

Figure 13:
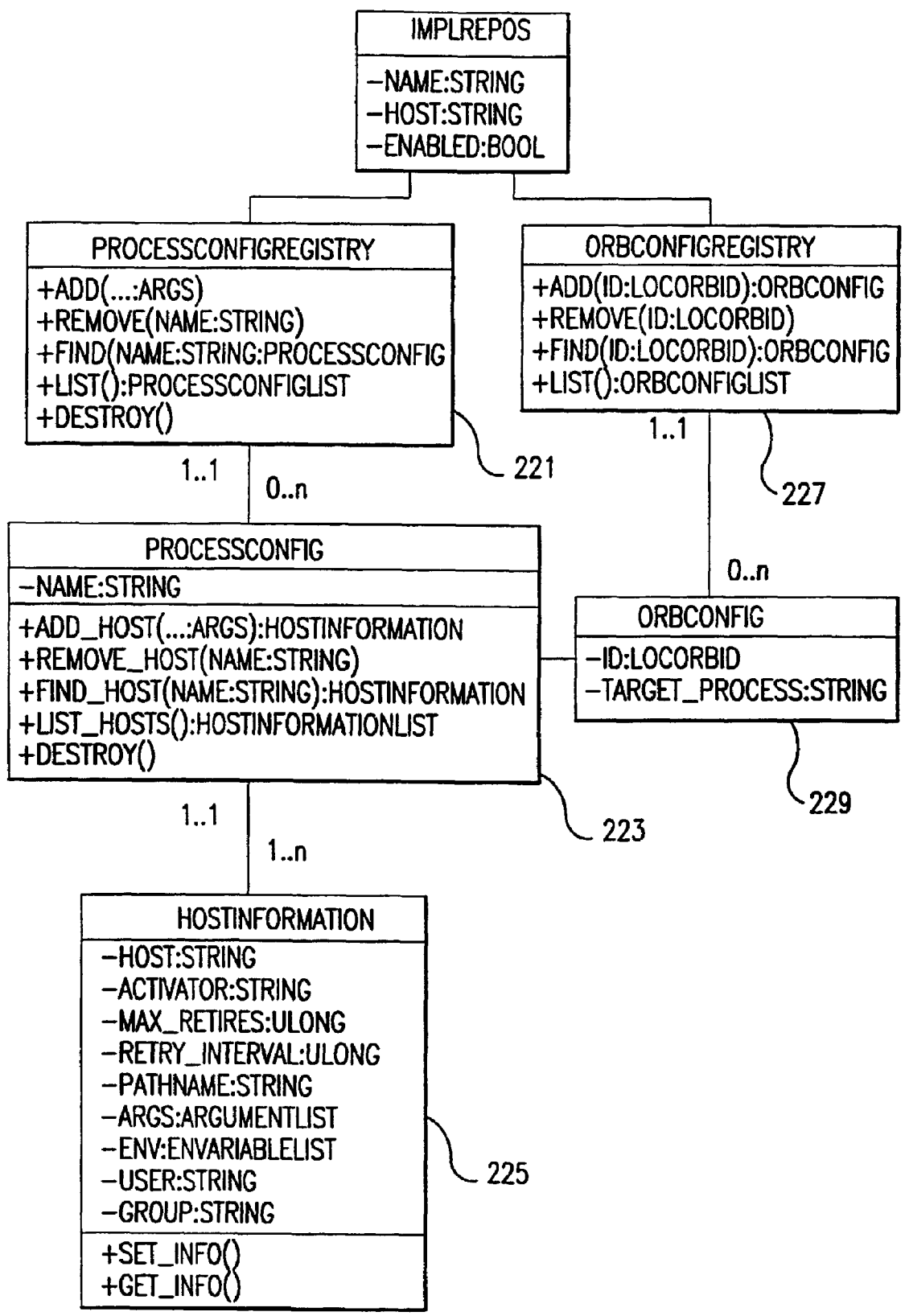
FIG. 13 is a diagram illustrating a class hierarch of OA independent information.

The destroy ( ) operation causes the OA repository to delete and remove all of its persistent data and to destroy itself 2. OA Independent Information The IR contains information that is not specific to any particular OA. The generic information contained in the IR is information related to server processes and location specific ORB instance identifiers (LocOrbId). The following sections describe this information in more detail by referring to FIG. 13.

(1) Process Information

The IR manages information about server processes through its ProcessConfigRegistry 221. The registry contains ProcessConfig 223 instances which specify the executable file that is to be started for the server process, which host or hosts the process will run on, command line arguments and environment variables that must be provided as well as other information.

```
module IT_IR
{
  enum StartupValue
  {
    ON_DEMAND,
    ALWAYS,
    MANUAL,
    DISABLE_START
  };
  interface ProcessConfigReqistry
  {
    ProcessConfig
    add (
      in string          name,
      in StartUpValue start_flag
    ) raises (ProcessAlreadyExists);
    void
    remove (
      in string name
    ) raises (ProcessNotExist);
    ProcessConfig
    find (
      in string name
    );
    interface Iterator
    {
      boolean
      next_batch (
        in unsigned long batch_size,
        out ProcessConfigList batch
      );
    };
    Iterator
    list ( ) ;
    void
    destroy ( );
  };
};
```

The add ( ) operation creates and registers a new process configuration record with the registry. The record specifies the server process information for the target server process specified by name, which must be unique relative to the registry. The start_flag is used to specify how and when the server process should be started. If an entry already exists for the specified name, the ProcessAlreadyExists exception is raised The remove ( ) operation removes and destroys the process configuration information associated with the target server process specified by name. All information associated with this target process is removes from the IR's persistent storage. If no entry exists for the specified name, the ProcessNotExist exception is raised.

The find ( ) operation returns a reference to the process configuration record specified by name. If no entry exists for the specified name, a NULL object reference is returned. The Iterator interface is used to iterate through a list of Process-Config entries. The next_batch ( ) operation returns the next "batch" of entries from the list. The number of entries returned in the batch sequence is specified by the batch_size parameter. If batch_size is zero, all the entries in the list are returned. Fewer than batch_size entries may be returned if the iterator has reached the end of the list. True is returned if there are more entries remaining in the list and false otherwise.

The list ( ) operation returns an iterator for the list of all the process configuration records associated with the Locator. The destroy ( ) operation removes from persistent storage all information associated with every process configuration record registered with the registry. The ProcessConfig interface represents the information needed to specify a server process. The configuration information may include multiple target hosts upon which the server process may be started. Each individual host has a separate record of startup information associated with the server process to specify how that process is to be started on the particular host. The host information is held in a HostInformation record, described below.

```
module IT_IR
{
    struct EnvVariable
    {
        string      name;
        string      val;
    };
    typedef sequence<EnvVariable> EnvVariableList;
    typedef sequence<string> ArgumentList;
    interface ProcessConfig
    {
        attribute name;
        attribute startup flag;
        HostInformation
        add_host (
            in string           host,
            in string           activator_name,
            in unsigned long    max_nbr_of_retries,
            in unsigned long    retry_interval,
            in string           pathname,
            in ArgumentList     arguments,
            in EnvVariableList  env_variables,
            in string           user,
            in string           group
        ) raises (HostAlreadyExists);
        void
        remove_host (
            in string host
        ) raises (HostNotExist);
        Host Information
        find_host(
            in string host
        );
        HostInformationList
        list_hosts ( );
        OrbConfigList
        list_orbs ( );
    };
    typedef sequence<ProcessConfig> ProcessConfigList;
};
```

The name attribute specifies the unique name, relative to the ProcessConfigRegistry in which it is registered, by which this target process is referenced in other persistent records.

The startup_flag attribute specifies how and when this server process will be started; ON_DEMAND indicates that the server process will be started when a request for an object implemented by the server process arrives, ALWAYS is an indication that the Locator should start the server process when the daemon is started and attempt to restart it if it dies, MANUAL indicates that the server process will be started by an entity other then the Locator and DISABLE_START is an indication that the Locator should make no attempt to start that particular server process (this is a temporary state).

The add_host ( ) operation adds a new target host and its associated startup information to the list of host information for this server process instance. If an entry already exists for the specified host, the HostAlreadyExists exception is raised. The host information is described in more detail below in the description of the HostInformation interface. The remove host ( ) operation removes the host information for the specified host and deletes all persistent storage information associated with it. If there is no entry for the specified host, the HostNotExist exception is raised. The find_host ( ) operation returns a reference to the host information for the specified host. If the entry does not exist a NULL object reference is returned. The list_hosts ( ) operation returns a list of the host information for all target hosts where this server process instance may be started.

The list_orbs ( ) operation returns a list of the ORB instances that are instantiated in this server process. The HostInformation 225 interface specifies the information needed to start a target server process on a specific host machine.

```
module IT_IR
{
    interface HostInformation
    {
        attribute string            host ;
        attribute string            activator_name;
        attribute unsigned long     max_nbr_of_retries;
        attribute unsigned long     retry_interval;
        attribute string            pathname;
        attribute ArgumentList      arguments;
        attribute EnvVariableList   env_variables;
        attribute string            user;
        attribute string            group;
        void
        set_info (
            in string           host,
            in string           activator_game,
            in unsigned long    max_nbr_of_retries,
            in unsigned long    retry_interval,
            in string           pathname,
            in ArgumentList     arguments,
            in EnvVariableList  env_variables,
            in string           user,
            in string           group
        );
        void
        get_info (
            out string          host,
            out string          activator_name,
            out unsigned long   max_nbr_of_retries,
            out unsigned long   retry_interval,
            out string          pathname,
            out ArgumentList    arguments,
            out EnvVariableList env_variables,
            out string          user,
            out string          group
        );
    };
    typedef sequence<HostInformation> HostInformationList;
};
```

The host attribute specifies a name for the target host that is unique relative to the Locator. The activator_name attribute specifies the Activator instance to use to start the target process on this host. There can be more than one Activator instance running on a given-host machine.

The max_nbr_of retries attribute specifies the maximum number of times the Locator should attempt to start the server process on this host machine if it fails to start. The retry_interval attribute specifies the number of seconds the Locator waits between attempts at starting the server process. The pathname attribute specifies the fully qualified pathname, relative to the host, for the executable that is to be used for this server process.

The executable process that is to be started by the Locator does not necessarily reflect the target server process that will ultimately be registered with the Locator. The executable that is started may be a shell script or other executable that actually creates the target server process.

The arguments attribute specifies the command line argument list that is passed to the executable started for this server process. The env_variables attribute specifies the environment variables that must be set in the process that is started for the server process. The user attribute specifies the effective user ID which should be used for the server process. The group attribute specifies the effective group ID which should be used for the server process. The set_info ( ) operation provides a mechanism for doing a "batch" update of the host information persistent data. The get_info ( ) operation provides a mechanism for doing a "batch" read of the host information persistent data.

(2) ORB Information

The IR maintains information about ORB instances that map a given ORB instance to a specific target server process. These ORB instances are referenced by a LocOrbId identifier that is unique relative to the Locator. To manage the ORB instance information the IR uses an OrbConfigRegistry 227. It should be noted that an OA repository observer can be added to the present invention.

As discussed above, an ID for an ORB instance that is unique across the entire location domain can be provided in the present invention. The ID can be treated in a hierarchical manner. In other words, a combination of the IR name and LocOrbId (unique relative to a given IR instance) can be used for this ID.

```
module IT_IR
{
  interface OrbConfigRegistry
  {
    OrbConfig
    add(
      in LocOrbId       id,
      in string         target_process
    ) raises (OrbAlreadyExists);
    void
    remove (
      in LocOrbId id
    ) raises (OrbNotExist);
    OrbConfig
    find (
      in LocOrbId id
    );
    interface Iterator
    {
      boolean
      next_batch(
        in unsigned long batch_size,
        out OrbConfigList batch
      );
    };
    Iterator
    list ( );
    void
    destroy ( );
  };
};
```

The add ( ) operation constructs an ORB configuration record for the specified id, which represents an instance that will be active in the specified target_process. If an entry already exists for the specified id, the OrbAlreadyExists exception is raised. The remove ( ) operation removes information about the specified ORB instance from the IR. If the specified entry does not exist, the OrbNotExist exception is reaised. The find ( ) operation returns a reference to the configuration information for the specified ORB instance. If no entry is found for the specified ORB a NULL object reference is returned. The Iterator interface is used to iterate through a list of OrbConfig entries.

The next_batch ( ) operation returns the next "batch" of entries from the list. The number of entries returned in the batch sequence is specified by the batch size parameter. If batch_size is zero, all the entries in the list are returned. Fewer than batch_size entries may be returned if the iterator has reached the end of the list. True is returned if there are more entries remaining in the list and false otherwise. The list ( ) operation returns an iterator for the list of all the ORB configuration records for this IR instance. The destroy ( ) operation removes and destroys the persistent data for all of the ORB configuration records for the IR.

An OrbConfig 229 interface represents the information maintained by the IR about a given ORB instance. Its primary responsibility is to map the ORB instance to the server process in which it will be active.

```
module IT_IR
{
  typedef sequence<octet> LocOrbId;
  interface OrbConfig
  {
  }
  attribute LocOrbId id;
  attribute string target_process;
  };
  typedef sequence<OrbConfig> OrbConfigList;
};
```

The id attribute is an identifier for the ORB instance that is unique relative to this IR instance. The target_process attribute specifies the name of the target server process where this ORB instance will be active. It should be noted that a reference to a process not specified in this IR instance can be allowed.

(3) Change Notification

OA specific registries may need to be notified of changes in the OA independent information in an IR instance. To support this an Observer pattern is used. The following describes these Observer interfaces and how they are used.

```
module IT_IR
{
  interface ProcessConfigRegistry
  {
    interface Observer
    {
      void
      add_notify (
        in ProcessConfig new_process
      );
      void
      remove_notify (
        in string process_name
      );
    };
    typedef unsigned long ObserverId;
```

```
ObserverId
register_observer (
    in Observer new_observer
);
void
unregister_observer
    in ObserverId id
) raises (
    ObserverNotRegistered
);
// remainder of ProcessConfigRegistry interface . . .
};
};
```

The ProcessConfigRegistry::Observer interface is used by an GA specific JR to register interest in changes to the ProcessConfigRegistry.

The add_notify ( ) operation is called when a new ProcessConfig entry is added to the registry. A reference to the newly added entry is provided to the Observer in the new_Process parameter. The remove_notify ( ) operation is called when a ProcessConfig entry is removed from the registry. The process name of the removed process is provided to the Observer. The register_observer ( ) operation is used by the OA IR to register an Observer instance with the IR. An ObserverId is returned to the caller to identify the Observer instance in subsequent calls to the registry.

The unregister_observer ( ) operation is used by the OA IR to unregister the Observer instance specified by id with the IR. The Observer instance will no longer be notified of ProcessConfig changes in the registry. If no Observer is registered with the specified id, an ObserverNotRegistered exception is raised.

Observers can be notified on individual changes to ProcessConfig instances.

```
module IT_IR
{
    interface OrbConfigRegistry
    {
    interface Observer
    {
      void
      add_notify(
        in Orbconfig new orb
      );
      void
      remove_notify (
        in LocOrbId orb_id
      );
    };
    typedef unsigned long ObserverId;
    ObserverId
    register_observer
        in Observer new_observer
    );
    void
    unregister_observer (
        in ObserverId id
    ) raises (
        ObserverNotRegistered
    );
    // remainder of OrbConfigRegistry interface . . .
    };
};
```

The OrbConfigRegistry::Observer interface is used by an OA specific IR to register interest in changes to the OrbConfigRegistry.

The add_notify ( ) operation is called when a new OrbConfig entry is added to the registry. A reference to the newly added entry is provided to the Observer in the new orb parameter. The remove_notify ( ) operation is called when a OrbConfig entry is removed from the registry. The orb_id of the removed process is provided to the Observer. The register observer ( ) operation is used by the OA IR to register an Observer instance with the IR. An ObserverId is returned to the caller to identify the Observer instance in subsequent calls to the registry. The unregister observer ( ) operation is used by the OA IR to unregister the Observer instance specified by id with the IR. The Observer instance will no longer be notified of OrbConfig changes in the registry. If no Observer is registered with the specified id, an ObserverNotRegistered exception is raised. It should be noted that observers can be notified on individual changes to OrbConfig instances.

3. POA Specific Information

The POA IR manages information specific to each endpoint that exists. An endpoint represents either a persistent POA instance or a logical entity referred to as a namespace. The purpose of a namespace is purely administrative and thus they are not used during runtime operation of the Locator. A namespace represents a transient POA name that has been registered and thus must be unique across the location domain. By registering a namespace, an application or administrator can reserve a POA namespace hierarchy that will be guaranteed to be unique across the location domain.

ART framework can provide a plug-in for the POA specific IR information, that will be loaded into the Generic Server process and work in conjunction with the Locator plug-in to provide the functionality required to support persistent POA based objects.

To manage the endpoint and namespace information the POA uses a PoaImplementationRepository. There may be multiple PoaImplementationRepository instances registered with a given ImplementationRepository instance.

```
module IT_POA_IR
{
    typedef sequence<octet> EndpointId;
    interface PoaImplementationRepository IT_IR::

OAImplementationRepository

{
        NamespaceConfig
        add_namespace (
            in EndpointId id,
            in boolean allow_dynamic_create
        ) raises (EntryAlreadyExists);
        EndpointConfig
        add_endpoint(
            in EndpointId id,
            in boolean allow_dynamic_create,
            in LocOrbId orb_id
        ) raises (EntryAlreadyExists);
        void
        remove (
            in EndpointId id
        ) raises (EntryNotExist);
        NamespaceConfig
        find(
            in EndpointId id
        );
        interface NamespaceIterator
```

-continued

```
{
  boolean
  next_batch (
    in unsigned longbatch_size,
    out NamespaceconfigList batch
  );
};
interface EndpointIterator
{
  boolean
  next_batch (
    in unsigned longbatch_size,
    out EndpointConfigList batch
  );
};
readonly attribute unsigned long number_of_endpoints;
EndpointIterator
list_endpoints(
   in unsigned long batch_size
);
readonly attribute unsigned long number of namespaces;
NamespaceIterator
list_namespaces ( );
unsigned long
endpoints_in_process (
   in string target_process
);
EndpointIterator
list_process(
   in string target_process
);
unsigned long
endpoints_in_orb(
   in LocOrbId id
);
EndpointIterator
list_orb_id (
   in LocOrbId id
);
};
};
```

The add_namespace ( ) operation creates a new namespace entity in the IR to represent the POA specified by id. The allow dynamic_create parameter indicates whether or not children of this namespace are allowed to dynamically create and register new endpoints with the Locator. If there is already an entry for either a namespace or endpoint with the specified id, the EntryAlreadyExists exception is raised.

The add_endpoint ( ) operation creates a new endpoint entry in the IR to represent a persistent POA with the specified id. The allow_dynamic create parameter is treated the same as in the add_namespace ( ) operation. The orb_id indicates which ORB instance, and thus which server process, this endpoint will be associated with. If there is already an entry for either a namespace or endpoint with the specified id, the EntryAlreadyExists exception is raised.

The remove ( ) operation removes and deletes the persistent data associated with the namespace or endpoint indicated by id. If no entry exists for the specified id, the EntryNotExist exception is raised. The find ( ) operation returns the namespace or endpoint indicated by the provided id. If no entry exists for the specified id, a NULL object reference is returned. The NamespaceIterator and EndpointIterator interfaces are used to iterate through a list of their respective types. The next_batch ( ) operation returns the next "batch" of entries from the list. The number of entries returned in the batch sequence is specified by the batch_size parameter. If batch_size is zero, all the entries in the list are returned. Fewer than batch_size entries may be returned if the iterator has reached the end of the list. True is returned if there are more entries remaining in the list and false otherwise.

The number_of_endpoints attribute species the number of endpoints registered with the IR. The list_endpoints ( ) operation returns a iterator for the list of all the endpoints that are registered with the IR. The number_of namespaces attribute species the number of namespaces registered with the IR. The list_namespaces ( ) operation returns an iterator for the list of all the namespaces (this includes endpoints) that are registered with the IR. The endpoints_in_process ( ) operation returns the total number of endpoints in the IR that are specified to be activated in the specified target_process. The list_process ( ) operation returns an iterator for all the endpoints registered with the IR that are associated with the indicated server process. NOTE: namespaces have no server process association and thus are not included in this list. The endpoints_in_orb ( ) operation returns the total number of endpoints in the IR that are specified to be activated in the specified ORB instance. The list_orb_id ( ) operation returns an iterator for all the endpoints registered with the IR that are associated with the indicated ORB instance. NOTE: namespaces have no server process association and thus are not included in this list.

(1) Namespace Information

A namespace is a logical entity that represents a transient POA instance that is used to reserve a namespace tn the POA name hierarchy. It also enables the ability to move endpoints from being serviced by one server process to another (see the Scenarios section below). The id for a namespace must be unique relative to the Locator.

The namespace ID can be scoped to the IR instance and use the IR name in conjunction with the namespace ID to create a unique ID relative to the locator.

module IT_POA_IR

```
{
  interface NamespaceConfig
  {
  attribute EndpointId id;
  attribute boolean allow_dynamic create;
  NamespaceConfig
  parent ( );
  NamespaceConfigList
  children ( );
  };
  typedef sequence<NamespaceConfig> NamespaceConfigList;
};
```

The id attribute identifies this namespace instance and must be unique relative to the Locator. It is a representation of the fully qualified POA name of the transient POA this namespace instance represents. The allow_dynamic create attribute indicates whether or not children namespaces or endpoints are allowed to dynamically create and register endpoints (which represent persistent POAs).

The parent ( ) operation returns a reference to the parent namespace instance of this namespace. If this namespace does not have a parent that is registered a NULL object reference is returned. The children ( ) operation returns a list of all the registered children namespace instances of this namespace.

(2) Endpoint Information

An endpoint is a specialization of a namespace. It represents a persistent POA and thus may be a target endpoint for activation of persistent objects. Through its association with a particular ORB instance it specifies which server process is used to service requests for its associated objects.

```
module IT_POA_IR
{
  interface EndpointConfig: NamespaceConfig
  {
    attribute LocOrbId orb_id;
  };
  typedef sequence<EndpointConfig> EndpointConfigList;
};
```

The orb_id attribute specifies the ORB instance, and thus server process, where this endpoint is to be activated.

4. Scenarios

Figure 14:
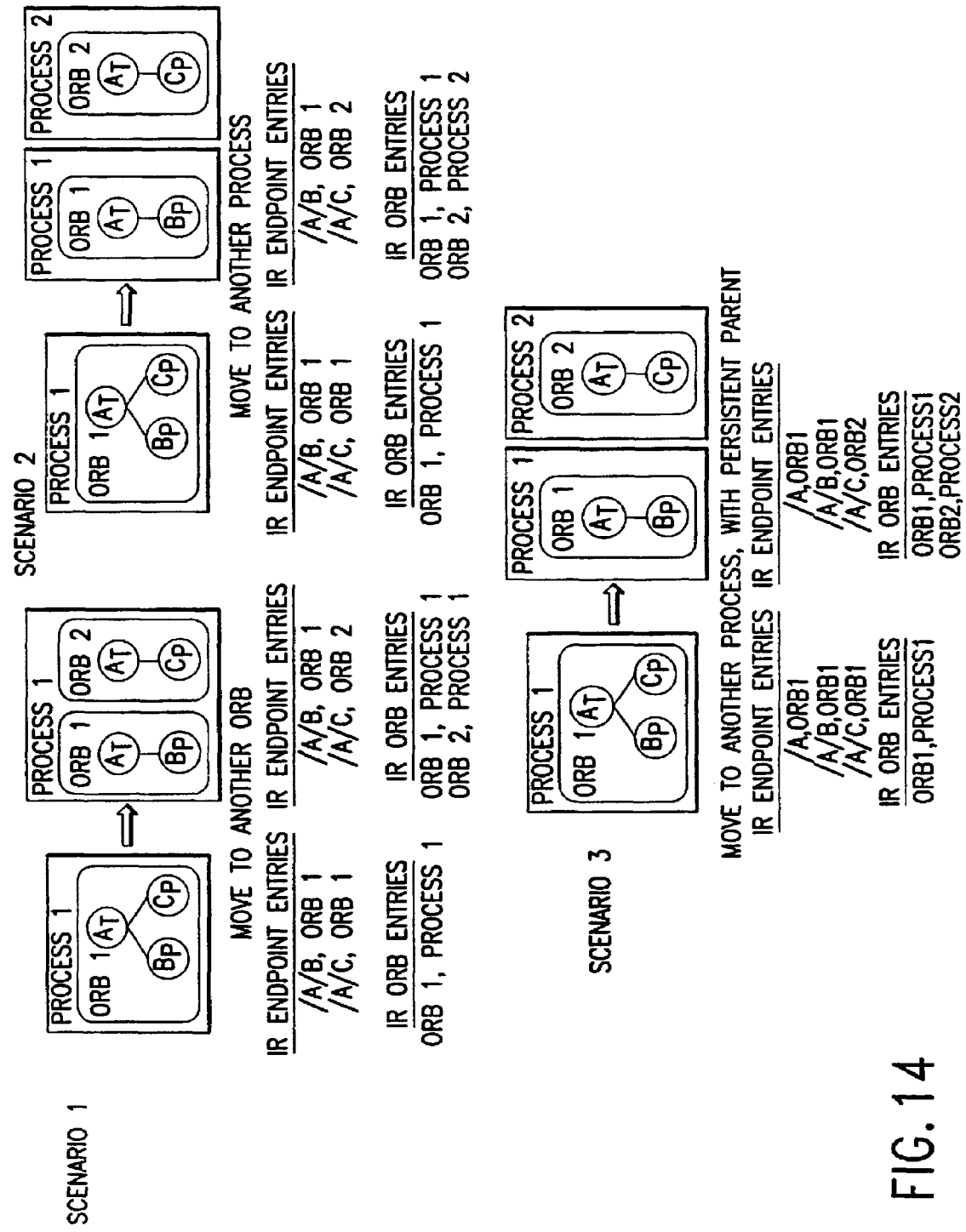
FIG. 14 is a diagram illustrating three scenarios of moving a POA from one ORB instance to another.

This section describes what happens in the IR during various scenarios of POA configuration and movement. FIG. 14 shows an example of moving a POA from one ORB instance to another in the same process and moving to a different ORB instance in another process.

In the first two scenarios, two persistent POAs, "B" and "C", that are children of a transient POA "A" and are in the same ORB instance. Each POA has an endpoint entry in the IR's endpoint table that maps the endpoint ID to the LocOrbId for the ORB instance and the there is an entry in the ORB table that maps the LocOrbId to a process. To move POA "C" from one ORB instance to another, a new entry must be created in the ORB table that maps the new LocOrbId to "Process 1" and the entry for POA "C" in the endpoint table must be changed to map to the new LocOrbId. Moving POA "C" to another process is very similar to moving it to another ORB instance. An new entry is created in the ORB table for a new LocOrbId which is mapped to "Process 2", and the entry in the endpoint table is modified to map to the new LocOrbId. From this example it should be evident that moving all the endpoints associated with an ORB instance from one process to another is as simple as modifying the entry for their associated LocOrbId in the ORB table to point to the new process.

Scenario 3 of FIG. 14 shows what happens when a POA with a persistent parent POA is moved to another process. In this case the moved POA "C" will have a transient parent POA "A", since the objects associated with POA "A" must be active in "Orb I" of "Process 1". It is not necessary in this situation to have a namespace entry for POA "A", even though it is logically a namespace, since an endpoint entry already exists for POA "A", thus reserving the POA "A" namespace.

IV. Generic Server

ART is designed for pluggability. There may be many types of plug-ins. This section addresses application-level plug-ins. An application-level plug-in is defined as a plug-in that is tied to the lifetime of a target process, whereas an ORB-level plug-in is tied to the lifetime of an ORB instance. An application-level plug-in can provide a locatability service, a process activation service, a naming service, etc. The application-level plug-ins provide the flexibility for a wide range of configuration and installation scenarios. How to configure application-level plug-ins will be left up to an installation.

The generic ART server is a container for an application-level plug-in. The generic ART server acts as the main( ) for an application-level plug-in. One or more generic ART servers may be configured within one location domain.

Note that services provided in a location domain are not required to be implemented as plug-ins and are not required to use the generic ART server. But some of the benefits are:

Allows component-izing services within ART.
Allows fewer executables running on a system. It should be noted that more than one application-leel plugin in a generic server can be provided. It should also be noted that the generic ART server is closely tied to ORB Management and Plug-In Management. Furthermore, the generic ART server is itself a target process in the ART framework, and all plug-ins are loaded and initialized on a per ORB basis.

Figure 15:
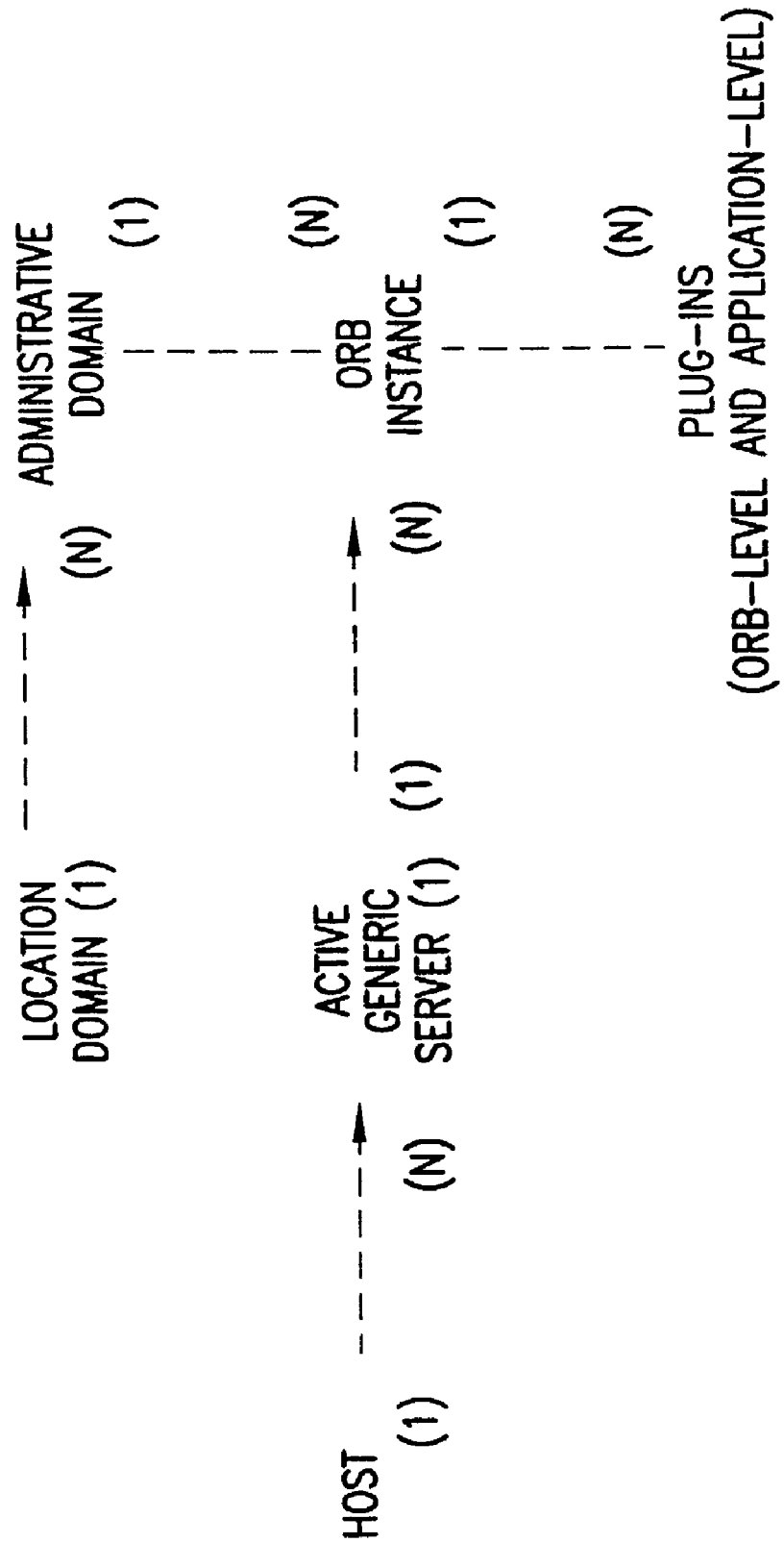
FIG. 15 is a diagram illustrating a generic sever model.

FIG. 15 illustrates two horizontal views of the generic server model. One from location domain to administrative domain, and then to ORB instance. The second from host to active generic server to ORB instance. One or more ORB instances may be initialized in one administrative domain spanning one or more hosts and generic servers. In addition, one or more plug-ins may be loaded and initialized in one ORB instance.

As noted above, the generic server acts as the main ( ) for a single application-level plug-in. The application-level plug-in name is specified as an argument to the generic server. The generic server performs the following:

Initializes the ORB via CORBA::ORB_init( ) with ORB-level plug-ins.
Activates the root POA manager so that Application-level plug-ins can create their own POAs and POA managers from the root POA.
Obtains a reference to the ConfigManager.
Obtains a reference to the PlugInMatager.
Loads and registers the Application-level plug-in(s) specified at the command line via PlugInManager::getplugin( ).
Initializes the Application-level plug-in(s) specified at the command line via ITAppPlugIn::app_init( ).

To shutdown the generic server, send a CTRL-C signal. The generic server's signal handler performs the following:

Shutdown the application-level plug-in via ITAppPlugIn::app_shutdown( ).
Shutdown the ORB and its ORB-level plug-ins via CORBA::ORB::shutdown( ).

It should be noted that a plug-in controlled POA with its own POA manager is created. In this way, all objects created will be managed by its own POA.

The generic server can support one or more ORB instances, and can support one or more application-level plug-ins.

The following features can also be proved in the generic server:

Command line switches as well as an environment setting for the generic ART daemon.
Relationship to an In-process Activator; Launching servers in separate processes.
An app-level plug-in can be designed to either be stand-alone or dependent on other plug-ins. An app-level plug-in loaded into a generic server can locate objects that might live in other app-level plug-ins.
The generic server can be dynamically signaled to load or unload a certain plug-in. A list of currently-loaded plug-ins can also be provided.
Each app-level plug-in can use its own POA.
The plug-ins are required to be dynamically loaded as well as statically linked to a generic ART server. The static linking requirement not defeat the purpose of a generic server. Alternatively, either static linking or dynamic loading to build the generic server can be provided.

V. General Plug-In

This section describes plug-ins in general and how they are managed by the ART core. It is expected that there will be a number of different types of plug-ins. All types, however, are derived from the ITPlugIn::PlugIn interface and share a common functionality.

All plug-ins are preferably managed by a single ITPlugIIn::PlugInManager object within the ART core.

1. An Overview of Plug-Ins

As noted above, there is a base plug-in interface, ITPlugIn::PlugIn. This interface contains common plug-in information, like the plug-in's name and version information. Plug-ins can be loaded and unloaded, registered and unregistered.

Loading a plug-in means loading the module in which the plug-in resides. A plug-in can be loaded into an application in a number of ways:

Linked directly to the application, either as object code or in a static library.

Linked with the application as a dynamic library and loaded by the system on start-up.

Loaded explicitly by the ORB or application when required.

Loaded implicitly by being contained in the same module as an explicitly loaded plug-in.

After a plug-in is loaded, it is registered with the PlugInManager to make it available to the application. The plug-in developer call PlugInManager:: register_plugin ( ) after the plug-in has been instantiated. This can be done from the plug-in's constructor.

The plug-in model is as follows:

The plug-in implementation code resides in a library. When the library is loaded, the plug-in is instantiated and its constructor registers it with the PlugInManager.

Plug-ins can be unloaded. Note that only dynamically loaded plug-ins can be unloaded. Unloading a plug-in causes it to be unregistered also.

2. Plug-In Initialization

After a plug-in is loaded and registered it is available for use by the application. However, different types of plug-in are used in different ways and at different times. To use a plug-in, the application first initializes it. When the application is finished using a plug-in, it informs it of this.

It is left to derived plug-in types to define their initialization and shutdown behavior. For example, an ORB level plug-in needs to be initialized and shutdown for each ORB instance, whereas an Application level plug-in is usually only and shutdown once.

Further, plug-ins are identified by their names. A plug-in's name is simply a string. As such, there is the possibility for name clashes. A naming convention can be provided in order to minimize name clashes.

In addition, it is somewhat specific to a derived plug-in type as to how arguments are passed to a plug-in in it's initialization phase. Therefore, an argument convention can be provided for argument naming, behavior of modifying the argument list, etc.

Plug-ins are expected to use the core configuration mechanism. A plug-in should retrieve its configuration information from a config scope of the same name as the plug-in. For example, the IIOP plug-in would expect to find values for its configuration variables in the "IIOP" configuration scope.

Moreover, a plug-in may require other plug-ins to be available before it can successfully be used. It can list these dependencies in the reserved configuration variable PrerequisitePlugIns, which may be present in any plug-in's configuration scope. The value for this variable is simply a list of plug-ins that must be loaded before this one. The PlugInManager will attempt to load each plug-in in this list. If one of these plug-ins cannot be loaded then the dependent plug-in will not be loaded, and a ITPlugIn::LoadFailed exception is thrown. This also raises the possibility of circular dependencies, e.g., if plug-in A depends on plug-in B, and plug-in B depends on plug-in A. The PlugInManager will detect such circular dependencies and raise a ITPlugIn::CircularDependency exception.

An implementation of the ITPlugIn::PlugInManager interface returns an object reference to the PlugInManager implementation object. This object reference is released after use.

The PlugInManager is used to load, unload, register and unregister plug-ins. But its main function is to obtain a reference to a plug-in.

When PlugInManager::get_plugin ( ) is called, the PlugInManager first checks its list of registered plug-ins. If a plug-in of that name is registered, an object reference to the plug-in is returned. If that plug-in has not already been registered, the PlugInManager uses the ConfigManager to get the value for the "LibraryName" configuration variable in the plug-in's configuration scope, and attempts to load it. It is assumed that the plug-in is registered with the PlugInManager when it is loaded. If the plug-in is successfully loaded but not registered, PlugInManager:: get_plugin ( ) throws a NotRegistered exception. If the plug-in is successfully loaded and registered, a reference to it is returned.

The caller of PlugInManager: get_plugin ( ) can then narrow the returned reference to the appropriate type.

3. Interfaces

The following interfaces are locality constrained.

```
// IDL module ITPlugIn
{
    typedef unsigned short PlugInType;
    const PlugInType ORB_PLUGIN = 0;
    const PlugInType APP_PLUGIN = 1;
    interface PlugIn
    {
    readonly attribute PlugInType type;
    readonly attribute string name;
    // More general plugin information.
};

interface PlugInManager
{
    exception LoadFailed
    }
        string reason;
    };
    exception CircularDependency { };
    except ion UnloadFailed { };
    exception NotRegistered { };
    exception AlreadyRegistered { };
    exception UnregisterFailed { };
    PlugIn
    get_plugin (
        in string plugin_name
        in ITCfg:: ConfigManager config
    ) raises (LoadFailed, CircularDependency, NotRegistered)
    void
    unload_plugin (
        in string plugin_name
    ) raises (UnLoadFailed);
    void
    register_plugin (
        in PlugIn plugin
    ) raises (AlreadyRegistered);
    void
    unregister_plugin (
        in string plugin_name
```

) raises (UnregisterFailed);
};
}; The plug-ins can be configured to be dynamically upgraded, or unloaded without shutting down the process.

VI. ORB Plug-In

This section describes ORB level plug-ins. An ORB level plug-in is one used by the ORB core. It is associated with an ORB instance.

Each ORB instance in a process is a member of an administrative domain. One of the functions of this domain is to specify what ORB level plug-ins are required for any ORBs that are members of it. This is done through a configuration variable called RequiredORBPlugIns.

When CORBA::ORB_init ( ) is called to initialize an ORB instance, each of the ORB's required plug-ins is also initialized. The ORB uses the PlugInManager to find and load any required plug-ins. It then calls each plug-in's ORBPlugIn::ORB_init ( ) method, passing in itself. If plug-in A is dependent on plug-in B, then plug-in B (and any of it's dependencies) is initialized before plug-in A.

If a required plug-in, or any plug-in it's dependent on, cannot be successfully loaded and initialized, CORBA::ORB_init ( ) raises a CORBA::INITIALIZE exception.

It should be noted that when the CORBA::INITIALIZE exception is raised, corresponding errors can be reported.

During it's ORBPlugIn::ORB_init ( ) call, the plug-in should create a PerORBState object. This object can hold any ORB-specific objects that the plug-in creates. This PerORBState object is returned to the ORB, which stores it.

The ORB level plug-ins can be configured purely through the ORB, i.e., its ConfigManager. This would allow the plug-in readonly access to the ORB's arguments if necessary, but discourages passing argument's to plug-ins directly.

It should be noted that not all plug-ins are required to be loaded before the ORB can operate successfully. Some plug-ins may be available to the ORB, but rarely used. In such cases, these plug-ins are not loaded until they are needed. For example, a security plug-in may not be needed until an encrypted request arrives.

One way a plug-in may be loaded on demand is by calling PlugInManager::get_plugin ( ). passing in the name of the plug-in to be loaded.

Another way is through CORBA::ORB::resolve_initial_references (in ObjectId identifier). This method provides a way for applications to obtain references to various objects and services, identified by an ObjectId. If the required object or service lives in a plug-in, then CORBA::ORB::resolve_initial_references ( ) will cause the plug-in to be loaded and initialized. During the plug-in's initialization phase, it will register the reference, which is then returned.

This works as follows: First, the ConfigManager is used to get a value for the "PlugInName" variable in the <ObjectId> scope. For example, a configuration file might contain the line, POA.PlugInName="POAapi". This plug-in is then loaded via the PlugInManager and initialized. As a consequence, a POA initial reference is registered, and returned to the caller.

Furthermore, when the ORB' is shutting down it first calls PerORBState::ORB_shutdown_phase1 ( ) and then PerORBState::ORB_shutdown_phase2 ( ) on each of its stored PerORBState objects. The ORB plug-in can then clean up any objects held by the PerORBState object.

The following is a exemplary interface:

// IDL

```
module ART_PlugIn
{
  interface PerORBState
  {
  void
  ORB_shutdown_phase1 ( );
  void
  ORB_shutdown_phase2 ( );
  };
  interface ORBPlugIn
  : ITPlugIn::PlugIn
  {
  PerORBState
  ORB_init(
     in ORB orb
  )
  };
};
```

VII. Event Handling

This section addresses event handling within ART. It presents a design for an event handler in the ART core. Event handling includes providing an interface between the ORB and the transports, allowing the main thread to be allocated to do ORB work when necessary, demultiplexing of multiple transports and the handling of foreign event loops.

The following is a discussion of the environment in which the event handling of the present inventions operates. The ORB Portability Joint Submission adds several thread-related operations to the ORB interface. These operations are included to support single-threaded ORBs as well as multi-threaded ORBs that run multi-thread-unaware code.

A single-threaded application can make no assumptions about the underlying ORB. To remain thread-safe, it specifies the Single Thread POA policy. To allow the ORB to perform work, it must either call run( ) or perform_work( ). By using the Single Thread POA policy, the application is guaranteed that requests will be processed sequentially, and any upcalls will be made in a thread-safe manner in the main thread.

A multi-threaded application that specifies the ORB Controlled POA policy does not need to call any of the above operations. However, calling run( ) may be useful to prevent the application from exiting until the ORB is shut down. A multi-threaded server may use the Single Thread POA policy, or a mixture of Single Thread and ORB Controlled policies. In this case it calls run( ) or perform_work( ) to allow work to be done by the POA with the Single Thread policy.

The new thread-related operations on the ORB are assumed to behave as follows:
boolean
ORB::work_pending( )
This operation returns true if there is work to be done and it needs to be done in the main thread. In a single-threaded ORB all work will be done in the main thread. A multi-threaded ORB will do work involving a POA with the Single Thread policy in the main thread, while ORB Controlled POAs may do work in any thread.
void
ORB::perform_work( )
If called by the main thread, does some work. Otherwise does nothing.
void
ORB::run( )
If called by the main thread, enables the ORB to do work using the main thread, until the ORB is shut down. Otherwise waits until the ORB shuts down. This does not mean the ORB can do not work, just that the thread the work is done in is undefined. A consequence of this is that no work associated with POAs that have specified the Single Threaded policy will be done if run( ) is called in a thread other than the main thread.

void
ORB::shutdown(boolean wait_for_completion)

Instructs the ORB to shut down. It optionally blocks until all ORB processing has completed. This includes request processing, object deactivation and other operations associated with object adapters. After this operation has been called, the ORB is no longer useable until ORB_init( ) is called again.

Details

The basic design of the event handler is that it contains a work queue and a Reactor described below. The interface to the event handler will be the same for both single- and multi-threaded implementations of ART, but the implementation of the event handler itself may be different.

Multi-Threaded Case

The work queue in the multi-threaded case is there to provide a means for work to be done in the main thread. Work relating to a POA that has the Single Thread policy can be done in the main thread.

When a request needs to be processed, the POA provided interceptor can determine which policies are in use. If the POA has the ORB Controlled thread policy, then the request gets dispatched immediately. Alternatively, if the Single Thread policy has been specified, the request gets put on the work queue to be processed by the main thread later.

The main thread can do work on the queue by calling ORB::perform_work( ) or ORB::run( ). The implementation of these functions is to check if there is any work pending on the queue and process it if so. If these calls are made from any other thread, no work will be done.

Single-Threaded Case

In a single-threaded process, no work is done until ORB::perform_work( ) or ORB::run( ) is called. Since the process is single-threaded, these can only be called form the main thread, so work will always be done if there is some pending. The implementation of these functions is to first check the queue for pending work. If there is nothing on the queue, the Reactor is queried.

The use of the Reactor allows multiple transports to be used in the single-threaded ORB. Each transport registers itself with the Reactor, which takes care of the demultiplexing. One constraint, however, is that each transport must be file descriptor based.

Note that the implementation of the POA's interceptor can be the same for both single- and multi-threaded cases. If a request comes in for a POA that has the ORB Controlled policy, it gets dispatched immediately. If the POA has the Single Thread policy it gets passed to the event handler via some method, e.g., EventHandler::handle_single_threaded_event( ). The multi-threaded event handler would put the event onto it's work queue to be processed by the main thread later on. The single-threaded event handler would immediately dispatch the event, since it must already be in the main thread.

The Reactor provides a method of demultiplexing synchronous events from multiple clients and dispatching them to the relevant handlers. There is a single Reactor provided in the ART core, each ORB holds a reference to it which can be obtained through resolve_initial_references( ). A transport plug-in would implement an event handler and register an instance of this with the Reactor for each file descriptor it's interested in. The Reactor waits in a system select( ) call. When a file descriptor fires, the Reactor calls the appropriate method of the registered handler to process that file descriptor.

In a multi-threaded environment, the transport need not register with the Reactor at all. Instead it can perform it's own processing. Any work that needs to be done in the main thread can be posted on to the work queue.

The following is a Reactor Interface:

interface ART_Reactor
{
  native EventType;
  void
  handle_events(
  in long timeout
  );
  void
  shutdown( );
  void
  register_handle(
  in ART_EventHandler h,
  in EventType t
  );
  void
  remove_handler(
  in ART_EventHandler h,
  in EventType t
  );
  void
  suspend_handler(
  in ART_EventHandler h
  );
  void
  resume_handler(
  in ART_EventHandler h
  );
};
void
ART_Reactor::handle_events(long timeout)

Starts the Reactor processing events, for timeout milliseconds. A timeout of IT_INFINITE_TIMEOUT means this method will not return until shutdowns has been called.

void
ART_Reactor::shutdown( )

Stops the Reactor. The Reactor will finish any operation it is currently in, then it will exit it's select( ) loop, causing handle_events( ) to return. It removes all handles from itself, so each registered event handler will get a handle_close( ) callback.

void
ART_Reactor::register_handler(ART_EventHandler h, EventType t)

Register the handler h, to be called back when an event of type t occurs. Event types can be READ_EVENT, EXCEPT_EVENT, WRITE_EVENT or some combination of all three, by bitwise 'or' ing them together. The handler gets called back on handler_input( ) when a READ_EVENT occurs, handle_exception( ) on an EXCEPT_EVENT, etc.

void
ART_Reactor::remove_handler(ART_EventHandler h, EventType t)

The handler h will no longer be called for events of type t. If this means that the handler is not interested in any events, the handler is removed from the Reactor.

void
ART_Reactor::suspend_handler(ART_EventHandler h)
The handler does not get called when any events occur. The handler is not actually removed however, and can be reactivated by calling resume_handler( ).
void
ART_Reactor::resume_handler(ART_EventHandler h)
The handler that was previously suspended by suspend_handler( ) is reactivated.

The following is an EventHandler interface:

native ART_Handle; // unsigned int—a file descriptor interface ART_EventHandler
{
    ART_Handle
    get_handle( );
    void
    set_handle(
    in ART_Handle h
    );
    boolean
    handle_input( );
    boolean
    handle_output( );
    boolean
    handle_exception( );
    boolean
    handle_timeout( );
    boolean
    handle_close( );
};
    ART_Handle
    ART_EventHandler::get_handle( )
    Returns the handle associated with this event handler.
    void
    ART_EventHandler::set_handle(ART_Handle h)
    Associates the handle h with this event handler.
    boolean
    ART_EventHandler::handle_input( )
    Called when the file descriptor associated with the handler is ready for reading. This method should not block.
    This method will also get called if the associated socket is closed by the client side. In this case there may be no data to be read from the socket. If this happens, the handler should be removed from the Reactor.
    boolean
    ART_EventHandler::handle_exception( )
    Called when the file descriptor associated with the handler is ready for writing. This method should not block.
    boolean
    ART_EventHandler::handle_output( )
    Called when the file descriptor associated with the handler is ready for writing. This method should not block.
    boolean
    ART_EventHandler::handle_timeout( )
    Called when a timeout has occurred.
    boolean
    ART_EventHandler::handle_close( )
    Called when the file descriptor associated with the handler has been removed from the Reactor. The file descriptor can now be safety closed.

The purpose of the work queue is to provide a way for the main thread to perform work associated with ORBs that specify the Single Thread policy, in a multi-threaded environment. Such work can be done in the main thread.

The work queue is populated by transports or interceptors. This work is processed when the main thread calls ORB::perform_work( ) or ORB::run( ). Note that since ORB::perform_work( ) only does work associated with that ORB, there will be a work queue per ORB. However, see the busy-loop issue below for a discussion on why it may be useful to allow the ORB to specify that it's work can done when ORB::perform_work( ) is called for any ORB. This could be achieved by having a process wide work queue that ORBs can share.

The following is a WorkQueue interface:

interface ART_Work
{
    void
    do_work( );
};

interface ART_WorkQueue
{
    boolean
    is_empty( );
    boolean
    post_job (
    in ART_Work job,
    in short priority
    );
    void
    process_jobs (
    in long timeout
    );
    boolean
    process_one_job(
    in long timeout
    );
    void
    stop_processing(
    in boolean process_remaining
    );
    void
    flush( );
};
    void
    ART_Work::do_work( )
    Called when job gets processed.
    boolean
    ART_WorkQueue::is_empty( )
    Returns true if the queue is empty.
    boolean
    ART_WorkQueue::postjob(ART_Work job, short priority, long timeout)
    Posts a job to the queue at the specified priority. The priority is represented by a value between 0 and 31. If the timeout is 0, this method fails to post and returns immediately if the queue is full. A timeout of IT_INFINITE_TIMEOUT means wait indefinitely to post the job.
    void
    ART_WorkQueue::processjobs(long timeout)
    Process the queue. If timeout is IT_INFINITE_TIMEOUT, this method will not return until stop_processing( ) is called. If timeout is 0, it returns immediately if there is no work to be done.
    boolean
    ART_WorkQueue::process_one_job(long timeout)

Process the first job on the queue. If timeout is IT_INFINITE_TIMEOUT, this method will not return until one job has been processed. If timeout is 0, it returns immediately if there is not work to be done. Returns true if work was done, false if it timed out.

void
ART_WorkQueue::stop_processing(boolean process_remaining

Stops the queue if it is processing jobs or waiting for jobs to process_remaining is true, then all jobs currently in the queue are processed. If process_remaining is false then all jobs in the queue are discarded. Any job that is being currently processed is completed.

void
ART_WorkQueue::flush( )

Empties the queue.

To hook into the Reactor, a transport plug in performs do the following:

First, create one or more implementations of the ART_EventHandler interface. For example, a typical transport plug-in would have one implementation for accepting new connections on a listening socket, and another for reading data from the connected sockets. Each instance of these EventHandler implementations is associated with a handle, or file descriptor, and gets called back whenever anything happens on that handle. For example if the file descriptor is ready for reading, the EventHandler::handle_input( ) method gets called.

In the plug-in's orb-initialise( ) code, obtain a reference to the Reactor using ORB::resolve_initial_references("IT_Reactor"). The EventHandlers can then be registered with the Reactor, using the register_handler( ) method. The EventType parameter indicates what type of event the EventHandler is interested in being notified of by the Reactor. This can be ART_Reactor::READ_EVENT, ART_Reactor::EXCEPT_EVENT, ART_Reactor::WRITE_EVENT, or some combination of the three.

EventHandlers can indicate that they are no longer interested in a particular type of event by calling the remove_handler( ) method. If the EventHandler is not interested in any type of event, it's removed from the Reactor. EventHandlers can be temporarily switched off and on by the suspend_handler( ) and resume_handler( ) methods.

When an EventHandler is removed from the Reactor, it gets called back on the handle_close( ) method. The associated file descriptor can then be safely closed. The file descriptor should not be closed before this method is called, because the Reactor could still be select( ) ing on it.

It should be noted that the Reactor can be limited to file descriptor based transports in single-threaded mode.

In both single- and multi-threaded models, use of select( ) in the Reactor can limit the number of file descriptors of MAX_FD_SETSIZE −1, which is typically 1023 on Unix and 63 on Win32. This limit could be overcome on Win32 by having multiple Reactors in different threads, but not on Unix due to the fact that fd_sets are bitsets.

The busy-loop problem can be described as follows: Consider a process containing multiple ORBs, and each ORB needs to use the main thread to perform some work. Since there is a different work queue for each ORB the application must check each one in turn to see if there is any work to be done. If there is not work to be done for any ORB, the process is still using processor time by constantly checking.

One solution to this problem is to allow an ORB to state that it wants it's work to be done whenever ORB::run( ) is called—even if it is called by another ORB. This is like an extra ORB policy. If this policy is not set, then no work would be done for that ORB until run( ) or perform_work( ) is called on it. This could be implemented by having the ORB use a process_wide work queue, instead of a per-ORB one.

The present invention allows an application to register its file descriptors with it, taking control over the applications fd based events. It is also possible for an applications to control events of the present invention by getting the file descriptors. There are two cases.

In the first case, the application can register it's file descriptors with ART. This is simply a matter of registering the foreign file descriptors with the Reactor. The application would derive from ART_EventHandler, register an instance of this class with the Reactor for each of it's file descriptors, and get called back whenever one of it's file descriptors fire.

In the second case, the ART can register it's file descriptors with an application. In turn, there are two ways to achieve this. One way is to disable the Reactor in the ART core, and instead just hand over any file descriptors registered with it to the application. The application will then call the Reactor back whenever one of the file descriptors file, and in turn the appropriate event handler is called. The second method is to leave the Reactor running as normal within the core. When the application ask for file descriptors, one end of a pipe can be returned. Then, whenever an event gets posted to the work queue, one byte can be written onto the pipe. The application will notice that an event is ready and call back. Then the event can be processed on the queue. Note that this second method only works in a multi-threaded environment, and the application only gets notification when work needs to be done in the main thread.

Although the preferred embodiments of the invention have been described in the foregoing description, it will be understood that the present invention is not limited to the specific embodiments described above.

What is claimed is:

1. A computer implemented method of activating a process, said method implemented via computer program code stored in said computer, said method comprising:
   generating one or more first plug-ins each configured to activate a target process;
   dynamically registering the first plug-ins with a second plug-in;
   permanently storing information relating to each registered first plug-in;
   activating at least one target process based on said permanently stored information;
   providing a unique identifier for each target process; and
   sending and receiving a message between the first and second plug-ins using the identifiers, wherein the message includes information relating to a state change of the target processes, and wherein the state includes an activated state and a deactivated state.

2. The method of claim 1 further comprising:
   storing a flag for each registered first plug-in;
   perpetually activating the corresponding target process if the flag is set to a first state; and
   activating the corresponding target process upon a request if the flag is set to a second state.

3. The method of claim 2 further comprising:
   generating an exception to indicate that a target process is inactive when its flag is not set to the first state or the second state.

4. A server computer in a client-server computer system, comprising:
   a processing unit; and
   a storage device storing computer program code implementing at least:
      one or more first plug-ins each configured to activate a target process;
      a second plug-in configured to dynamically register the first plug-ins and to permanently store information relating to the registered first plug-ins; and a memory configured to store a flag for each registered first plug-in, wherein the second plug-in is further configured to perpetually activate target processes having their flags set at a first state and to activate target processes upon receiving a request, having their flags set at a second state.

5. The server of claim 4 wherein the second plug-in is further configured to generate an exception to indicate that the target process is inactive when the flag is not set to the first state or the second state.

6. The server of claim 4 further comprising:
a first computer program object configured to provide a unique identifier for each target process and configured to send a message using the identifiers.

7. The server of claim 6 wherein the message includes information relating a state change of the target processes, and wherein the state includes an activated state and a deactivated state.

* * * * *

UNITED STATES PATENT AND TRADEMARK OFFICE
CERTIFICATE OF CORRECTION

PATENT NO.       : 7,562,369 B1
APPLICATION NO.  : 09/890536
DATED            : July 14, 2009
INVENTOR(S)      : Julie Salamone et al.

It is certified that error appears in the above-identified patent and that said Letters Patent is hereby corrected as shown below:

Column 11, line 58, delete "in boonlean    wait_for_completion" and
  insert therefore --in boolean    wait_for_completion--.

Column 22, line 29, delete "interface ProcessConfigReqistry" and
  insert therefore --interface ProcessConfigRegistry--.

Column 31, line 67, delete "application-leel" and insert therefore --application-level--.

Column 32, line 24, delete "PlugInMatager" and insert therefore --PlugInManager--.

Column 33, line 1, delete "ITPlug1In::" and insert therefore --ITPlugIn::--.

Column 35, line 43, delete "( )." and insert therefore --( ),--.

Column 38, line 45, delete "shutdowns" and insert therefore --shutdown( )--.

Signed and Sealed this

Twenty-second Day of December, 2009

David J. Kappos
*Director of the United States Patent and Trademark Office*